United States Patent
Suzuki et al.

(10) Patent No.: US 12,155,929 B2
(45) Date of Patent: Nov. 26, 2024

(54) IMAGING DEVICE, PROCESSING DEVICE, DATA TRANSMISSION SYSTEM, AND DATA TRANSMISSION METHOD FOR TRANSMISSION OF IMAGE DATA

(71) Applicant: SONY GROUP CORPORATION, Tokyo (JP)

(72) Inventors: Yusuke Suzuki, Tokyo (JP); Takahiro Koyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 158 days.

(21) Appl. No.: 17/637,026

(22) PCT Filed: Jun. 5, 2020

(86) PCT No.: PCT/JP2020/022299
§ 371 (c)(1),
(2) Date: Feb. 21, 2022

(87) PCT Pub. No.: WO2021/039011
PCT Pub. Date: Mar. 4, 2021

(65) Prior Publication Data
US 2022/0279110 A1    Sep. 1, 2022

(30) Foreign Application Priority Data
Aug. 30, 2019    (JP) .................. 2019-158635

(51) Int. Cl.
*H04N 23/66* (2023.01)
*H04N 1/00* (2006.01)

(52) U.S. Cl.
CPC ......... *H04N 23/66* (2023.01); *H04N 1/00209* (2013.01)

(58) Field of Classification Search
CPC .... H04N 25/41; H04N 23/698; H04N 19/167; H04N 23/66; H04N 1/00209; H04N 23/60; H04N 23/61; H04N 21/4728
See application file for complete search history.

(56) References Cited

U.S. PATENT DOCUMENTS

2018/0270445 A1* 9/2018 Khandelwal ........... G06V 20/49
2020/0053281 A1   2/2020 Sugioka et al.

FOREIGN PATENT DOCUMENTS

CN    110710222 A    1/2020
JP    2001-094939 A    4/2001
(Continued)

OTHER PUBLICATIONS

International Search Report and Written Opinion of PCT Application No. PCT/JP2020/022299, issued on Aug. 25, 2020, 10 pages of ISRWO.

*Primary Examiner* — Nicholas G Giles
(74) *Attorney, Agent, or Firm* — CHIP LAW GROUP

(57) ABSTRACT

An imaging device according to an embodiment of the present disclosure includes an imaging unit, an encoding section, and a sending section. The imaging unit acquires captured image data by imaging. The encoding section encodes a plurality of pieces of image data as one piece of image data for transmission. The plurality of pieces of image data is based on one or more pieces of captured image data acquired by the imaging unit. The sending section sends the image data for transmission to an external device. The image data for transmission is generated by the encoding section.

18 Claims, 23 Drawing Sheets

(56) References Cited

FOREIGN PATENT DOCUMENTS

| | | |
|---|---|---|
| JP | 2007-013697 A | 1/2007 |
| JP | 2017-212690 A | 11/2017 |
| JP | 2018-137567 A | 8/2018 |
| WO | 2018/155258 A1 | 8/2018 |
| WO | 2018/225449 A1 | 12/2018 |

* cited by examiner

FIG. 15

```
                                                    dx
┌─────────────────────────────────────────────────┐
│  ┌───────────────────────────────────────────┐  │
│  │ • FRAME NUMBER     1                      │  │
│  │ • ROI NUMBER       1                      │ ╱da
│  │ • ROI POSITION     (Xa1,Ya1) (XLa1,YLa1)  │  │
│  │ • CAMERA NUMBER    1                      │  │
│  │ • CAMERA POSITION  (Xma1,Yma1,Zma1)       │  │
│  └───────────────────────────────────────────┘  │
│  ┌───────────────────────────────────────────┐  │
│  │ • FRAME NUMBER     2                      │  │
│  │ • ROI NUMBER       1                      │ ╱db
│  │ • ROI POSITION     (Xa2,Ya2) (XLa2,YLa2)  │  │
│  │ • CAMERA NUMBER    1                      │  │
│  │ • CAMERA POSITION  (Xma1,Yma1,Zma1)       │  │
│  └───────────────────────────────────────────┘  │
│  ┌───────────────────────────────────────────┐  │
│  │ • FRAME NUMBER     2                      │  │
│  │ • ROI NUMBER       2                      │ ╱dc
│  │ • ROI POSITION     (Xa3,Ya3) (XLa3,YLa3)  │  │
│  │ • CAMERA NUMBER    1                      │  │
│  │ • CAMERA POSITION  (Xma1,Yma1,Zma1)       │  │
│  └───────────────────────────────────────────┘  │
└─────────────────────────────────────────────────┘
```

FIG. 20

```
                                                              dy
┌─────────────────────────────────────────────────────────┐
│  ┌───────────────────────────────────────────────┐      │
│  │ • FRAME NUMBER      2                         │      │
│  │ • ROI NUMBER        3                         │╌╌ dd2│
│  │ • ROI POSITION      (Xa8, Ya8)(XLa8, YLa8)   │      │
│  │ • CAMERA NUMBER     1                         │      │
│  │ • CAMERA POSITION   (Xma1, Yma1, Zma1)       │      │
│  └───────────────────────────────────────────────┘      │
│  ┌───────────────────────────────────────────────┐      │
│  │ • FRAME NUMBER      3                         │      │
│  │ • ROI NUMBER        1                         │╌╌ de │
│  │ • ROI POSITION      (Xa5, Ya5)(XLa5, YLa5)   │      │
│  │ • CAMERA NUMBER     1                         │      │
│  │ • CAMERA POSITION   (Xma1, Yma1, Zma1)       │      │
│  └───────────────────────────────────────────────┘      │
│  ┌───────────────────────────────────────────────┐      │
│  │ • FRAME NUMBER      3                         │      │
│  │ • ROI NUMBER        2                         │╌╌ df │
│  │ • ROI POSITION      (Xa6, Ya6)(XLa6, YLa6)   │      │
│  │ • CAMERA NUMBER     1                         │      │
│  │ • CAMERA POSITION   (Xma1, Yma1, Zma1)       │      │
│  └───────────────────────────────────────────────┘      │
└─────────────────────────────────────────────────────────┘
```

FIG. 26
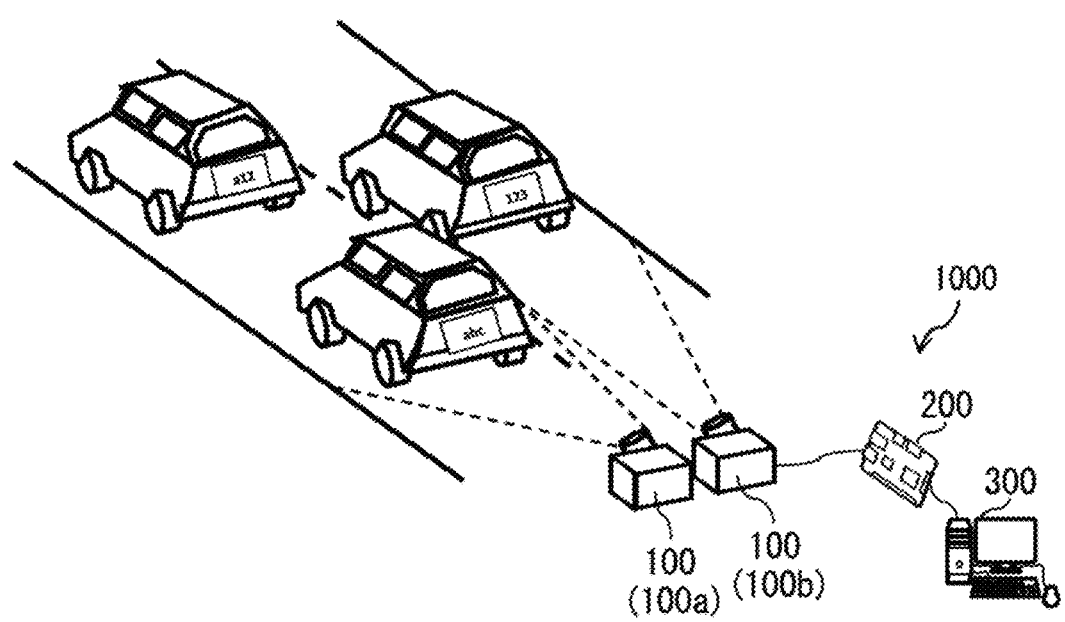
FIG. 27
| IMAGE DATA OF IMAGING DEVICE 100a | IMAGE DATA OF IMAGING DEVICE 100b |
|---|---|
| 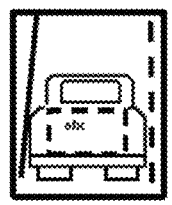 | 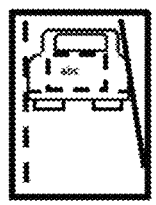 |
| Frame1 | Frame1 |

IMAGING DEVICE, PROCESSING DEVICE, DATA TRANSMISSION SYSTEM, AND DATA TRANSMISSION METHOD FOR TRANSMISSION OF IMAGE DATA

CROSS REFERENCE TO RELATED APPLICATIONS

This application is a U.S. National Phase of International Patent Application No. PCT/JP2020/022299 filed on Jun. 5, 2020, which claims priority benefit of Japanese Patent Application No. JP 2019-158635 filed in the Japan Patent Office on Aug. 30, 2019. Each of the above-referenced applications is hereby incorporated herein by reference in its entirety.

TECHNICAL FIELD

The present disclosure relates to an imaging device, a processing device, a data transmission system, and a data transmission method.

BACKGROUND ART

Technology has been developed that is related, for example, to the coupling between devices such as the coupling between a processor and a sensor. The technology related to the coupling between devices includes, for example, the technology described in PTL 1 described below.

CITATION LIST

Patent Literature

PTL 1: Japanese Unexamined Patent Application Publication No. 2017-212690

SUMMARY OF THE INVENTION

For example, as electronic apparatuses each have higher performance, more functions, and the like, some of electronic apparatuses each including a processing device such as a processor include a plurality of imaging devices. For example, the technology described in PTL 1 shifts the output timings (that are referred to simply as "output timings of the respective imaging devices") of pieces of image data from the respective imaging devices to achieve one-to-one coupling between an imaging device and the processing device. Such one-to-one coupling has the problem that it is difficult to control output timings of the respective imaging devices.

An imaging device according to an embodiment of the present disclosure includes an imaging unit, an encoding section, and a sending section. The imaging unit acquires captured image data by imaging. The encoding section encodes a plurality of pieces of image data as one piece of image data for transmission. The plurality of pieces of image data is based on one or more pieces of captured image data acquired by the imaging unit. The sending section sends the image data for transmission to an external device. The image data for transmission is generated by the encoding section.

In the imaging device according to the embodiment of the present disclosure, the plurality of pieces of image data based on the one or more pieces of captured image data acquired by the imaging unit is encoded as the one piece of image data for transmission and the encoded image data for transmission is sent to the external device. This also makes it possible to control, in a case where the imaging device according to the embodiment of the present disclosure is coupled to the transmission path common to the other one or more imaging devices, a data output timing of the imaging device according to the embodiment of the present disclosure to offer a timing that is appropriate in relation to data output timings of the other one or more imaging devices coupled to the common transmission path.

A processing device according to an embodiment of the present disclosure includes a receiving section, a generation section, and a sending section. The receiving section sequentially receives pieces of image data for transmission from a plurality of respective imaging devices coupled to a common transmission path through the transmission path. The pieces of image data for transmission are obtained by encoding a plurality of pieces of image data. The generation section generates control signals for sending timings of the pieces of image data for transmission on the basis of a frame rate of the transmission path. The sending section sends the control signals generated by the generation section to the plurality of imaging devices.

In the processing device according to the embodiment of the present disclosure, the control signals for the sending timings of the pieces of image data for transmission are generated on the basis of the frame rate of the transmission path to which the plurality of imaging devices is coupled and the control signals are sent to the plurality of imaging devices through the transmission path. This makes it possible to control the timings at which the pieces of image data for transmission are sent from the respective imaging devices to the common transmission path to offer appropriate timings.

A data transmission system according to an embodiment of the present disclosure includes a plurality of imaging devices and an external device that are coupled to a common transmission path. Each of the imaging devices includes an imaging unit, an encoding section, and a first sending section. The imaging unit acquires captured image data by imaging. The encoding section encodes a plurality of pieces of image data as one piece of image data for transmission. The plurality of pieces of image data is based on one or more pieces of captured image data obtained by the imaging unit. The sending section sends the image data for transmission to the external device at a timing based on a control signal inputted from the external device. The image data for transmission is generated by the encoding section. Meanwhile, the external device includes a receiving section, a generation section, and a second sending section. The receiving section sequentially receives the pieces of image data for transmission from the plurality of respective imaging devices through the transmission path. The generation section generates control signals as signals for sending timings of the pieces of image data for transmission on the basis of a frame rate of the transmission path. The second sending section sends the control signals generated by the generation section to the plurality of imaging devices.

In the data transmission system according to the embodiment of the present disclosure, the plurality of pieces of image data based on the one or more pieces of captured image data obtained by the imaging unit is encoded as the one piece of image data for transmission and the encoded image data for transmission is sent to the external device at the timing based on the control signal inputted from the external device. The control signals are generated as signals for sending timings of the pieces of image data for transmission on the basis of the frame rate of the transmission path and the signals are sent from the external device to the plurality of imaging devices. This makes it possible to control data sending timings of the respective imaging devices to offer appropriate timings.

A data transmission method according to an embodiment of the present disclosure is a data transmission method for a plurality of imaging devices and an external device that are coupled to a common transmission path. The data transmission method includes the following three:

encoding, by each of the imaging devices, a plurality of pieces of image data as one piece of image data for transmission and then sending the image data for transmission to the external device through the transmission path at a timing based on a control signal inputted from the external device, the plurality of pieces of image data being based on one or more pieces of captured image data obtained by imaging, the image data for transmission being obtained by encoding;

sequentially receiving, by the external device, the pieces of image data for transmission from the plurality of respective imaging devices through the transmission path; and generating, by the external device, the control signals as signals for sending timings of the pieces of image data for transmission on the basis of a frame rate of the transmission path and sending the signals to the plurality of imaging devices.

In the data transmission method according to the embodiment of the present disclosure, the plurality of pieces of image data based on the one or more pieces of captured image data obtained by imaging is encoded as the one piece of image data for transmission and the encoded image data for transmission is sent to the external device at the timing based on the control signal inputted from the external device. The control signals are generated as signals for sending timings of the pieces of image data for transmission on the basis of the frame rate of the transmission path and the signals are sent from the external device to the plurality of imaging devices. This makes it possible to control data sending timings of the respective imaging devices to offer appropriate timings.

BRIEF DESCRIPTION OF DRAWING

FIG. 15 is a diagram illustrating an example of data included in meta data in FIG. 13.

FIG. 20 is a diagram illustrating an example of data included in meta data in FIG. 18.

FIG. 26 is a diagram illustrating an example in which the embedded vision system is applied to traffic management.

FIG. 27 is a diagram illustrating an example of a frame image.

MODES FOR CARRYING OUT THE INVENTION

The following describes modes for carrying out the present disclosure in detail with reference to the drawings. The following description is a specific example of the present disclosure, but the present disclosure is not limited to the following modes.

<1. Embodiment>
[Configuration]

Figure 1:
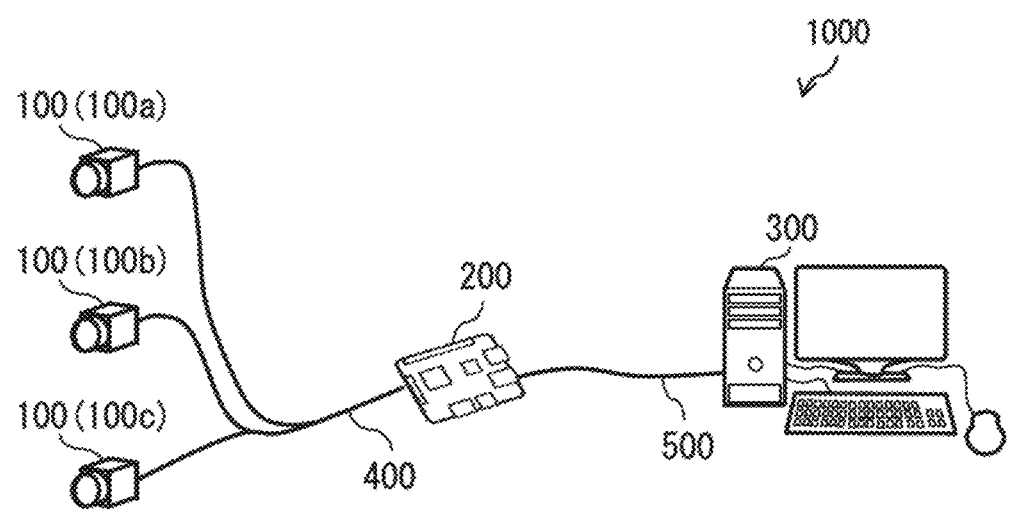
FIG. 1 is a diagram illustrating a schematic configuration example of an embedded vision system.

FIG. 1 illustrates a schematic configuration example of an embedded vision system 1000 according to the present embodiment. The embedded vision system 1000 includes a plurality of imaging devices 100, an embedded processor 200, and an external system 300, for example, as illustrated in FIG. 1. FIG. 1 exemplifies the three imaging devices 100 (100a, 100b, and 100c) as the plurality of imaging devices 100.

The plurality of imaging devices 100 and the embedded processor 200 are electrically coupled by a common transmission path 400. The transmission path 400 is one signal transmission path that couples the plurality of imaging devices 100 and the embedded processor 200. Data (image data) indicating an image sent from the imaging device 100 is transmitted from the imaging device 100 to the embedded processor 200 through the transmission path 400. The embedded processor 200 and the external system 300 are electrically coupled by a transmission path 500. The transmission path 500 is one signal transmission path that couples the embedded processor 200 and the external system 300. Data (image data) indicating an image sent from the embedded processor 200 is transmitted from the embedded processor 200 to the external system 300 through the transmission path 500.

The imaging device 100 has an imaging function and a sending function and sends image data generated by imaging. The imaging device 100 serves as a sending device in the embedded vision system 1000. The imaging device 100 includes, for example, an image sensor device having any type of system such as an "imaging device including a digital still camera, a digital video camera, a stereo camera, and a polarization camera", an "infrared sensor", or a "distance image sensor" that is able to generate an image. The imaging device 100 has a function of sending the generated image. An image generated by the imaging device 100 corresponds to data indicating a result of sensing by the image sensor 100. An example of a configuration of the imaging device 100 is described in detail with reference to FIGS. 2 and 3.

The imaging device 100 sends data (also referred to as "image data of a region" below) corresponding to a region set for image data in a sending method described below. A region set for an image is referred to as ROI (Region Of Interest). The following refers to a region set for an image as "ROI". In addition, the image data of a region is referred to as "ROI image data".

The imaging device 100 sends ROI image data. In other words, the imaging device 100 sends a portion of image data. This allows the imaging device 100 to transmit a smaller amount of data than the whole of the image data. The imaging device 100 thus sends ROI image data to attain a variety of effects, for example, such as shorter transmission time or reduced load on the embedded vision system 1000 for transmission that are attained by a reduced amount of data. It is to be noted that the imaging device 100 is also able to send the whole of the image data.

The embedded processor 200 receives data sent from the imaging device 100 and processes the sent data. The embedded processor 200 serves as an interface conversion device in the embedded vision system 1000. An example of a configuration for processing data sent from the imaging device 100 is described below in detail with reference to FIG. 3.

The embedded processor 200 includes, for example, one or two or more processors each including an arithmetic circuit such as MPU (Micro Processing Unit), a variety of processing circuits, and the like. The embedded processor 200 performs a variety of processes such as a process for the interface conversion control described above. The embedded processor 200 may control a function of the imaging device 100, for example, by sending control information to the imaging device 100. The embedded processor 200 is also able to control data sent from the imaging device 100 by sending region designation information to the imaging device 100.

(Imaging Device 100)

Figure 2:
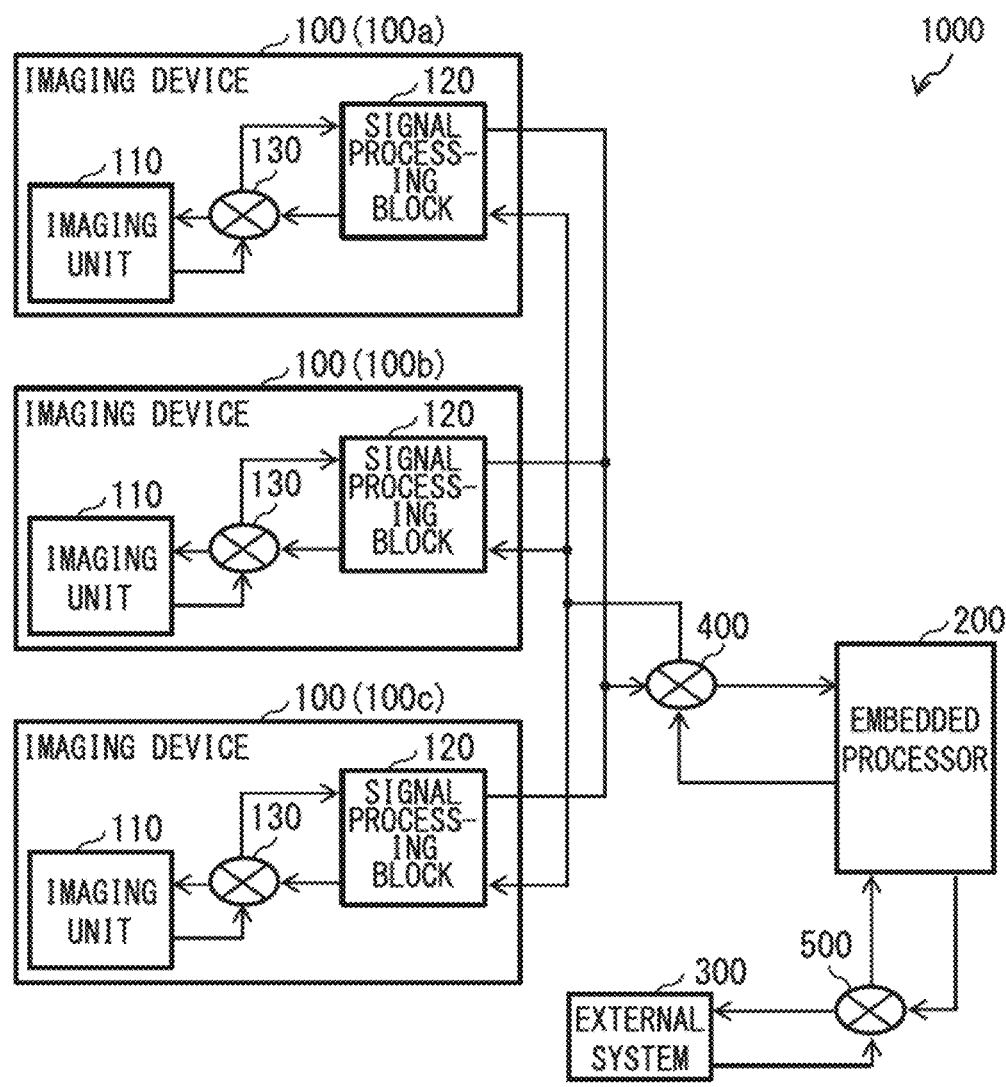
FIG. 2 is a diagram illustrating an example of a functional block of an imaging device.
Figure 3:
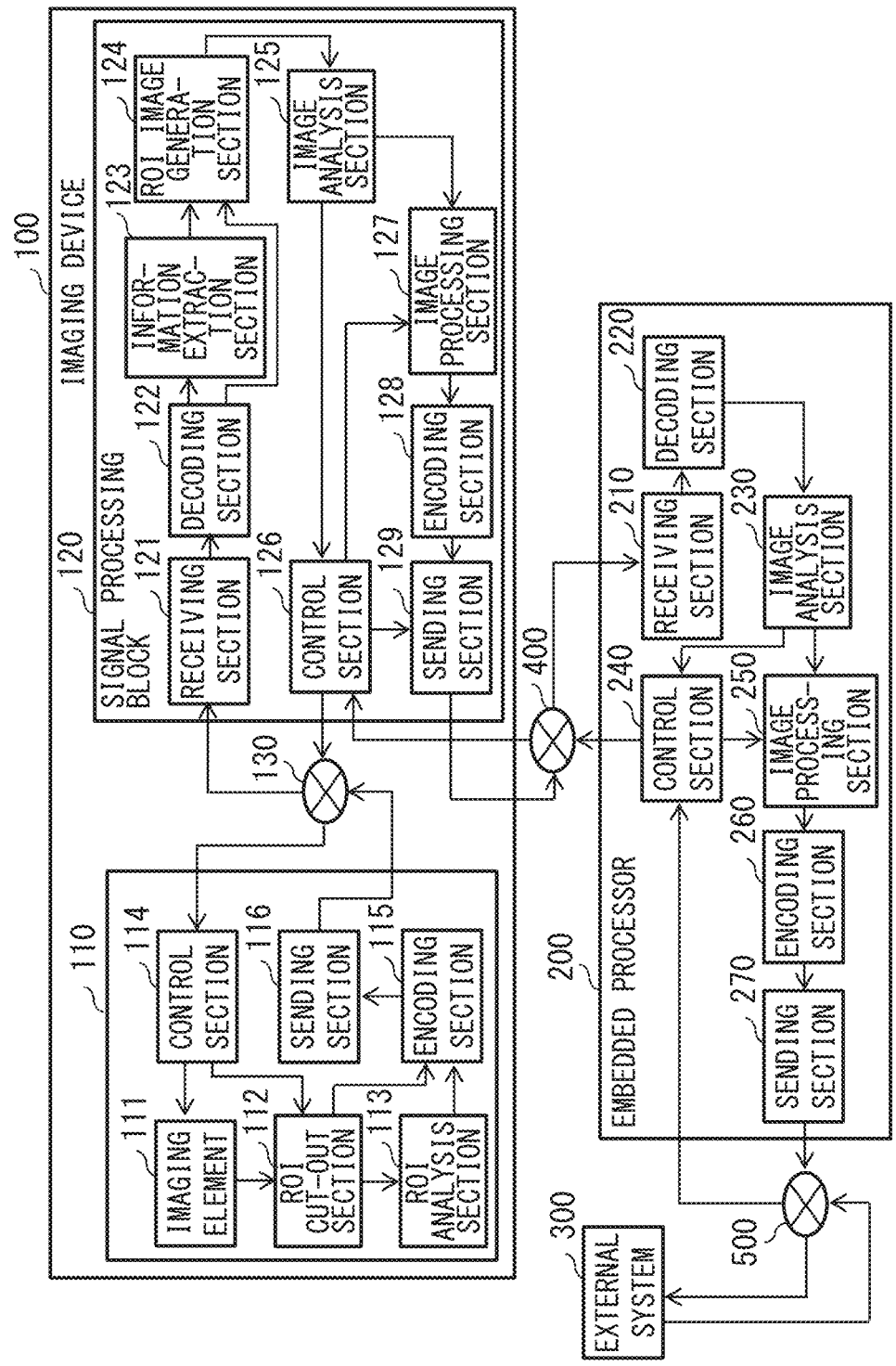
FIG. 3 is a diagram illustrating an example of a functional block of the embedded vision system.

FIG. 2 illustrates an example of a functional block of each of imaging devices. FIG. 3 illustrates an example of a functional block of the embedded vision system 1000. FIG. 3 illustrates only one of the plurality of imaging devices 100. The imaging device 100 includes, for example, an imaging unit 110, a signal processing block 120, and a transmission path 130. The imaging unit 110 and the signal processing block 120 are electrically coupled by the transmission path 130. The transmission path 130 is one signal transmission path that couples the imaging unit 110 and the signal processing block 120. Data (image data) indicating an image sent from the imaging unit 110 is transmitted from the imaging unit 110 to the signal processing block 120 through the transmission path 130. In the transmission path 130, for example, data is transmitted by using an interface standard common to the transmission path 400. In the transmission path 130, data may be transmitted by using an interface standard different from that of the transmission path 400.

The imaging unit 110 includes, for example, an imaging element 111, a ROI cut-out section 112, a ROI analysis section 113, a control section 114, an encoding section 115, and a sending section 116.

The imaging element 111 converts an optical image signal to image data. The optical image signal is obtained, for example, through an optical lens or the like. The imaging element 111 acquires image data 111A (captured image data), for example, by imaging at an exposure timing inputted from the control section 114. In a case where the imaging element 111 is a polarization camera, the image data 111A is luminance data for each polarization direction. The imaging element 111 includes, for example, a CCD (Charge Coupled Device) image sensor or a CMOS (Complementary Metal Oxide Semiconductor) image sensor, for example. The imaging element 111 includes an analog-digital conversion circuit and converts analog image data to digital image data. The data format after the conversion may be a YCbCr format in which the color of each pixel is represented by a luminance component Y and chrominance components Cb and Cr or may be an RGB format. The imaging element 111 outputs the image data 111A (the digital image data) obtained by imaging to the ROI cut-out section 112.

For example, in a case where a control signal for an instruction to cut out ROI is inputted from the control section 114, the ROI cut-out section 112 identifies one or more objects (targets) included in the image data 111A inputted from the imaging element 111 and sets ROI for each of the identified objects. Images of the one or more objects (targets) are to be shot. The ROI is, for example, a rectangular region including the identified object. It is to be noted that the shape of ROI is not limited to a rectangular shape. For example, ROI may have a circular shape, an oval shape, a polygonal shape, or an irregular shape. The ROI cut-out section 112 may set one or more ROIs in the image data 111A inputted from the imaging element 111, for example, on the basis of ROI information (e.g., positional information of ROI or the like) inputted from the control section 114.

The ROI cut-out section 112 cuts out pieces of image data (pieces of ROI image data 112A) of the one or more ROIs from the image data 111A. The ROI cut-out section 112 further assigns a frame number d1 (a frame identifier), a ROI number d2 (a ROI identifier), and a camera number d3 (the identifier of the imaging device 100) for each of the set ROIs. The frame number d1 is a frame number assigned to the image data 111A from which ROI is cut out. The ROI number d2 is an identifier assigned to each ROI in each piece of image data 111A. The camera number d3 is an identifier assigned to each of the imaging devices 100.

For example, the ROI cut-out section 112 assigns "1" to the image data 111A acquired at certain time t1 as the frame number d1. The ROI cut-out section 112 assigns, as the frame number d1, "2" to the image data 111A acquired after a predetermined period elapses from the time t1 (time t2). The ROI cut-out section 112 stores, for example, the assigned frame numbers d1 in a storage section. For example, in a case where two ROIs are set in the image data 111A, the ROI cut-out section 112 assigns "1" to one of the ROIs as the ROI number d2 and assigns "2" to the other ROI as the ROI number d2. The ROI cut-out section 112 stores, for example, the assigned ROI number d2 in the storage section. For example, the ROI cut-out section 112 assigns "1" to the image data 111A acquired from the imaging device 100a as the camera number d3. The ROI cut-out section 112 assigns "2" to the image data 111A acquired from the imaging device 100b as the camera number d3. The ROI cut-out section 112 assigns "3" to the image data 111A acquired from the imaging device 100c as the camera number d3. The ROI cut-out section 112 stores, for example, the assigned camera number d3 in the storage section.

The ROI cut-out section 112 stores, for example, the respective pieces of ROI image data 112A cut out from the pieces of image data 111A in the storage section. The ROI cut-out section 112 further stores, for example, the frame number d1, the ROI number d2, and the camera number d3 assigned to each of the ROIs in the storage section in association with the ROI image data 112A. It is to be noted that, in a case where the storage section of each of the imaging devices 100 stores the positional data of the imaging device 100 or in a case where each of the imaging devices 100 is provided with a device (a position measurement device) that measures the position of the imaging device 100, the ROI cut-out section 112 stores, for example, the positional data (a camera position d4) of the imaging device 100 acquired from the storage section or the position measurement device in the storage section in association with the ROI image data 112A along with the frame number d1, the ROI number d2, and the camera number d3.

It is to be noted that, in a case where a control signal for an instruction to output a normal image (an entire image) is inputted from the control section 114, the ROI cut-out section 112 performs a predetermined process on the image data 111A inputted from the imaging element 111. This causes the ROI cut-out section 112 to generate entire image data 112B.

The ROI analysis section 113 derives a ROI position (a ROI position d5) in the image data 111A for each ROI. The ROI position d5 includes, for example, the upper left end coordinates of ROI, the length of ROI in the X axis direction, and the length of ROI in the Y axis direction. The length of ROI in the X axis direction is, for example, the physical region length of the ROI in the X axis direction. The length of ROI in the Y axis direction is, for example, the physical region length of the ROI in the Y axis direction. The physical region length refers to the physical length (the data length) of ROI. The ROI position d5 may include the coordinates of a position different from the upper left end of ROI. The ROI analysis section 113 stores, for example, the derived ROI position d5 in the storage section.

For example, the ROI analysis section 113 assigns the frame number d1, the ROI number d2, and the camera number d3 to the ROI image data 112A. The ROI analysis section 113 stores, for example, the derived ROI position d5, the frame number d1, the ROI number d2, and the camera number d3 in the storage section in association with the ROI image data 112A. The ROI analysis section 113 may store, for example, the derived ROI position d5, the frame number d1, the ROI number d2, the camera number d3, and the camera position d4 in the storage section in association with the ROI image data 112A. The following refers to a series of pieces of data (e.g., the frame number d1, the ROI number d2, the camera number d3, the camera position d4, and the ROI position d5) regarding the ROI image data 112A as auxiliary data 115B.

The encoding section 115 encodes, for example, the one or more pieces of ROI image data 112A to generate image data 115A. Encoding means putting a plurality of data units (e.g., the plurality of pieces of ROI image data 112A) together as one data unit (e.g., the image data 115A). It is to be noted that, in a case where the one piece of ROI image data 112A is inputted to the encoding section 115, the encoding section 115 may output the one inputted piece of ROI image data 112A as the image data 115A without encoding. The encoding section 115 reduces data, for example, by encoding 10-bit RGB data as 30-bit data of 16-bit or 32-bit alignment data. It is to be noted that the encoding section 115 may perform a compression process on the one or more pieces of ROI image data 112A. The encoding section 115 outputs, for example, the image data 115A and the auxiliary data 115B regarding the ROI image data 112A that is the original data of the image data 115A to the sending section 116. The auxiliary data 115B may include, for example, the frame number d1, the ROI number d2, the camera number d3, and the ROI position d5) or may include the frame number d1, the ROI number d2, the camera number d3, the camera position d4, and the ROI position d5.

The encoding section 115 may encode, for example, the one or more pieces of entire image data 112B to generate the image data 115A. The encoding section 115 outputs, for example, the image data 115A and the auxiliary data 115B to the sending section 116. In this case, the auxiliary data 115B includes, for example, a series of pieces of data (the frame number d1 and the camera number d3) corresponding to the one or more pieces of entire image data 112B that are the original data of the image data 115A. The auxiliary data 115B may include, for example, the frame number d1, the camera number d3, and the camera position d4 as the series of pieces of data described above.

The control section 114 controls the imaging element 111 and the ROI cut-out section 112 on the basis of signals inputted from the signal processing block 120. The control section 114 instructs the imaging element 111 to perform imaging, for example, at an exposure timing and a frame rate inputted from the signal processing block 120. The control section 114 outputs, for example, ROI information (e.g., the ROI position d5 and the like) inputted from the signal processing block 120 to the ROI cut-out section 112.

The sending section 116 is a circuit that generates and sends transmission data 116A including data (the image data 115A and the auxiliary data 115B) inputted from the encoding section 115. The sending section 116 sends, for example, the auxiliary data 115B in EmbeddedData. The sending section 116 further sends, for example, the image data 115A in PayloadData of LongPacket. The sending section 116 sends, for example, the image data 115A in an image data frame and sends the auxiliary data 115B in the header of the image data frame. The sending section 116 generates and sends the transmission data 116A, for example, in accordance with a rule defined by SROI (Smart Region Of Interest) in the MIPI CSI-2 standard or the MIPI CSI-3 standard.

The signal processing block 120 includes, for example, a receiving section 121, a decoding section 122, an information extraction section 123, a ROI image generation section 124, an image analysis section 125, a control section 126, an image processing section 127, an encoding section 128, and a sending section 129.

The receiving section 121 includes, for example, a header separator, a header interpreter, a Payload separator, an EBD interpreter, and a ROI data separator.

The header separator receives the transmission data 116A through the transmission path 130. The header separator includes, for example, the auxiliary data 115B in EmbeddedData and receives the transmission data 116A including the image data 115A in PayloadData of LongPacket. The header separator separates the transmission data 116A, for example, in accordance with a rule defined by SROI (Smart Region Of Interest) in the MIPI CSI-2 standard or the MIPI CSI-3 standard. The header separator separates, for example, the received transmission data 116A into a header region and a packet region.

The header interpreter identifies the position of PayloadData of LongPacket included in the packet region, for example, on the basis of the data (specifically, EmbeddedData) included in the header region. The Payload separator separates PayloadData of LongPacket included in the packet region from the packet region, for example, on the basis of the position of PayloadData of LongPacket identified by the header interpreter.

For example, the EBD interpreter outputs, for example, EmbeddedData to a data separator as EBD data. The EBD interpreter further determines, for example, from the data type included in EmbeddedData whether or not the image data included in PayloadData of LongPacket is the image data 115A of the image data (the ROI image data 112A) of ROI. The EBD interpreter outputs, for example, a result of the determination to the ROI data separator.

In a case where the image data included in PayloadData of LongPacket is the image data 115A of the image data (the ROI image data 112A) of ROI, the ROI data separator outputs, for example, PayloadData of LongPacket to the decoding section 122 as PayloadData.

The decoding section 122 decodes the image data 115A to generate image data 122A. The decoding section 122 decodes the image data 115A included, for example, in PayloadData to generate the image data 122A. The information extraction section 123 extracts the auxiliary data 115B, for example, from EmbeddedData included in the EBD data. Decoding means extracting data (e.g., the image data 122A) that has not yet been encoded from one data unit (e.g., the image data 115A).

In a case where the original data of the image data 115A is the one or more pieces of ROI image data 112A, the information extraction section 123 extracts, for example, the frame number d1, the ROI number d2, the camera number d3, and the ROI positions d5, for example, from EmbeddedData included in the EBD data. In a case where the original data of the image data 115A is the one or more pieces of ROI image data 112A, the information extraction section 123 may extract, for example, the frame number d1, the ROI numbers d2, the camera number d3, the camera position d4, and the ROI positions d5, for example, from EmbeddedData included in the EBD data.

In a case where the original data of the image data 115A is the one or more pieces of entire image data 112B, the information extraction section 123 extracts, for example, the frame numbers d1 and the camera number d3, for example, from EmbeddedData included in the EBD data. In a case where the original data of the image data 115A is the one or more pieces of entire image data 112B, the information extraction section 123 may extract, for example, the frame numbers d1, the camera number d3, and the camera position d4, for example, from EmbeddedData included in the EBD data.

The ROI image generation section 124 generates (restores) the one or more pieces of ROI image data 112A or the one or more pieces of entire image data 112B, for example, on the basis of the image data 122A obtained by decoding and the auxiliary data 115B.

The image analysis section 125 analyzes the ROI image data 112A, for example, in accordance with the control of the embedded processor 200. The image analysis section 125 analyzes, for example, the ratio between color components of an image such as RGB and the brightness of the image necessary for white balance, exposure correction, or the like. The image analysis section 125 further does an analysis (an image deviation determination), for example, about whether or not the ROI image data 112A includes the whole of an object (a target) serving as a subject or a predetermined percentage or a higher percentage of the object. In a case where a result thereof indicates that a portion of an object (a target) serving as a subject is missing in the ROI image data 112A or in a case where a result thereof indicates that a predetermined percentage or a higher percentage of the target is not included, the image analysis section 125 corrects the ROI position d5 or the exposure timing or the frame rate of the imaging unit 110, for example, to cause the ROI image data 112A to include the whole of the object (the target) serving as a subject or the predetermined percentage or the higher percentage of the object. The image analysis section 125 outputs, for example, the corrected ROI position d5 or the corrected exposure timing or frame rate of the imaging unit 110 to the imaging unit 110 through the control section 126. The image analysis section 125 outputs data including, for example, the ROI image data 112A and the auxiliary data 115B (or the auxiliary data 115B including the corrected ROI position d5) to the image processing section 127. The image analysis section 125 outputs, for example, data including the entire image data 112B and the auxiliary data 115B to the image processing section 127.

The control section 126 sends the ROI position d5 corrected by the image analysis section 125 or the exposure timing or the frame rate of the imaging unit 110 corrected by the image analysis section 125 to the imaging unit 110. The control section 126 sends a signal inputted from the embedded processor 200 to the imaging unit 110. The control section 126 sends, for example, the ROI position d5 inputted from the embedded processor 200 and the exposure timing and the frame rate inputted from the embedded processor 200 to the imaging unit 110. The control section 126 outputs, for example, a command to execute the image deviation determination described above to the image analysis section 125. The command is inputted from the embedded processor 200.

The control section 126 controls the image processing section 127 or the sending section 129, for example, on the basis of a signal (a first control signal) inputted from the embedded processor 200. The control section 126 outputs, for example, the data size (the data capacitance) included in the signal inputted from the embedded processor 200 to the image processing section 127. The control section 126 hereby causes the image processing section 127 to execute an output data size adjustment described below. The control section 126 outputs, for example, the output timing of transmission data 129A included in the signal inputted from the embedded processor 200 to the sending section 129. The control section 126 hereby instructs the sending section 129 to output the transmission data 129A at the output timing outputted to the sending section 129.

The image processing section 127 performs a predetermined process, for example, on the one or more pieces of ROI image data 112A and then outputs data including the one or more pieces of ROI image data 112A and the one or more pieces of auxiliary data 115B regarding the one or more pieces of ROI image data 112A to the encoding section 128. The image processing section 127 carries out, for example, a digital gain, white balance, LUT, color matrix conversion, defect correction, shading correction, noise removal, image data rearrangement, γ correction, and demosaic (e.g., a process of rearranging outputs from imaging elements having a Bayer arrangement to RGB). The image processing section 127 selects the one or more pieces of image data 125A from the one or more pieces of image data 111A and the one or more pieces of ROI image data 112A (that are referred to as a "plurality of pieces of image data 125A inputted from the image analysis section 125" below) inputted from the image analysis section 125, for example, to bring a predetermined data size described below closer to a data size inputted from the control section 126. In other words, the image processing section 127 selects the one or more pieces of image data 125A from the plurality of pieces of image data 125A inputted from the image analysis section 125, for example, to refrain from outputting the one or more pieces of image data 125A having greatly different data sizes to the encoding section 128 whenever outputting the one or more pieces of image data 125A to the encoding section 128. The following refers to the selection of the one or more pieces of image data 125A by the image processing section 127 as "output data size adjustment".

Here, the "predetermined data size" refers to the data size of image data 128A (described below) that is image data for transmission or the total data size of one or more pieces of image data included in the image data 128A. In addition, the "one or more pieces of image data 125A" selected by the image processing section 127 include the following combinations. The plurality of pieces of ROI image data 112A may be extracted from the same image data 111A or may be extracted from the plurality of pieces of image data 111A obtained at different imaging timings in (1), (5), and (7) below.

(1) the plurality of pieces of ROI image data 112A
(2) the one piece of entire image data 112B
(3) the plurality of pieces of entire image data 112B
(4) the one piece of ROI image data 112A+the one piece of entire image data 112B
(5) the plurality of pieces of ROI image data 112A+the one piece of entire image data 112B
(6) the one piece of ROI image data 112A+the plurality of pieces of entire image data 112B
(7) the plurality of pieces of ROI image data 112A+the plurality of pieces of entire image data 112B The image processing section 127 outputs data including the one or more selected pieces of image data 125A and the one or more pieces of auxiliary data 115B regarding the one or more selected pieces of image data 125A to the encoding section 128.

The encoding section 128 encodes the one or more pieces of image data 125A to generate the image data 128A. The encoding section 128 reduces data, for example, by encoding 10-bit RGB data as 30-bit data of 16-bit or 32-bit alignment data.

The sending section 129 is a circuit that generates and sends the transmission data 129A including the data inputted from the encoding section 128. The sending section 129 generates the transmission data 129A and sends the transmission data 129A to the embedded processor 200. The transmission data 129A includes, for example, the image data 128A and the one or more pieces of auxiliary data 115B regarding the one or more pieces of image data 125A that are the original data of the image data 128A. The image data 128A is generated by encoding the one or more pieces of image data 125A.

The sending section 129 sends, for example, the one or more pieces of auxiliary data 115B in EmbeddedData. The sending section 129 further sends, for example, the image data 128A in PayloadData of LongPacket. The sending section 129 sends, for example, the image data 128A in a data frame and sends the auxiliary data 115B in the header of the data frame. The sending section 129 generates the transmission data 129A, for example, in accordance with a rule defined by the MIPI CSI-2 standard or the MIPI CSI-3 standard and sends the transmission data 129A to the embedded processor 200 through the transmission path 400. The MIPI CSI-2 standard or the MIPI CSI-3 standard is an interface standard in which the imaging device 100 and the embedded processor 200 are coupled in a one-to-one manner.

The sending section 129 sends the transmission data 129A to the embedded processor 200 through the transmission path 400, for example, at a predetermined output timing. The sending section 129 sends the transmission data 129A to the embedded processor 200 through the transmission path 400, for example, at an output timing based on a signal (a first control signal) inputted from the control section 126.

The embedded processor 200 includes, for example, a receiving section 210, a decoding section 220, an image analysis section 230, a control section 240, an image processing section 250, an encoding section 260, and a sending section 270.

The receiving section 210 sequentially receives the pieces of transmission data 129A, for example, from the plurality of respective imaging devices 100 coupled to the common transmission path 400 through the transmission path 400. The pieces of transmission data 129A each include the image data 115A obtained by encoding the one or more pieces of image data 125A and the one or more pieces of auxiliary data 115B regarding the one or more pieces of image data 125A that are the original data of the image data 115A. The receiving section 210 receives, for example, the pieces of transmission data 129A (the pieces of image data 115A) from the plurality of respective imaging devices 100 by using an interface standard in which one of the plurality of imaging devices 100 and the receiving section 210 are coupled in a one-to-one manner. Such an interface standard is, for example, the MIPI CSI-2 standard or the MIPI CSI-3 standard. The receiving section 210 includes, for example, a header separator, a header interpreter, a Payload separator, an EBD interpreter, and a ROI data separator. The receiving section 210 executes a process on the transmission data 129A. The process is similar to that of the receiving section 121 described above.

The decoding section 220 generates the one or more pieces of image data 125A by decoding the image data 128A included in the transmission data 129A. The decoding section 220 decodes the image data 128A included, for example, in PayloadData to generate the one or more pieces of image data 125A. The one or more pieces of image data 125A obtained by decoding correspond to any of (1) to (7) described above.

The image analysis section 230 analyzes the one or more pieces of ROI image data 112A included in data obtained by decoding in accordance with the control of the control section 240. The image analysis section 230 analyzes, for example, the ratio between color components of an image such as RGB and the brightness of the image necessary for white balance, exposure correction, or the like in the one or more pieces of ROI image data 112A. For example, in a case where the image analysis section 125 does not make the image deviation determination described above, the image analysis section 230 further makes the image deviation determination described above for the respective pieces of ROI image data 112A. In a case where the ROI position d5 or the exposure timing or the frame rate of the imaging unit 110 is corrected as a result of the image deviation determination described above, the image analysis section 230 outputs the corrected ROI position d5 or the corrected exposure timing or frame rate to the imaging unit 110 through the control section 240 and the signal processing block 120.

The image analysis section 230 outputs data including the one or more pieces of image data 125A and the one or more pieces of auxiliary data 115B regarding the one or more pieces of image data 125A to the image processing section 250. In a case where the ROI position d5 is corrected, the image analysis section 230 outputs the corrected ROI position d5 to the control section 240.

In a case where the image analysis section 230 corrects the ROI position d5, the control section 240 sends the corrected ROI position d5 to the signal processing block 120 (the imaging device 100). In other words, in a case where the image analysis section 230 corrects the ROI position d5, the control section 240 sends the corrected ROI position d5 to the imaging unit 110 through the signal processing block 120. The control section 240 generates a control signal for the sending timing of the transmission data 129A (the image data 128A) on the basis of the frame rate of the transmission path 400. The control section 240 sends the generated control signal for a sending timing to the signal processing block 120 (the imaging device 100). The control section 240 generates, as the control signals for sending timings, signals defining sending timings that, for example, allow the pieces of transmission data 129A (the pieces of image data 128A) from the plurality of respective imaging devices 100 to be sequentially received through the transmission path 400. The control section 240 generates a control signal for a data size serving an index for encoding on the basis of the frame rate of the transmission path 400. The control section 240 sends the generated control signal for a data size to the signal processing block 120 (the imaging device 100). The control section 240 generates, as the control signal for a data size, a signal defining a data size that, for example, allows the pieces of transmission data 129A (the pieces of image data 128A) from the plurality of respective imaging devices 100 to be received at a predetermined frame rate.

The image processing section 250 performs a predetermined process on the one or more pieces of image data 125A and then outputs data including the one or more pieces of image data 125A and the one or more pieces of auxiliary data 115B to the encoding section 260. The image processing section 250 carries out, for example, a digital gain, white balance, LUT, color matrix conversion, defect correction, shading correction, noise removal, image data rearrangement, γ correction, and demosaic (e.g., a process of rearranging outputs from imaging elements having a Bayer arrangement to RGB).

The encoding section 260 encodes the one or more pieces of image data 125A to generate image data 260A. The encoding section 260 reduces data, for example, by encoding 10-bit RGB data as 30-bit data of 16-bit or 32-bit alignment data.

The sending section 270 is a circuit that generates and sends transmission data 270A including the data inputted from the encoding section 260. The sending section 270 generates and sends the transmission data 270A including the image data 260A and the one or more pieces of auxiliary data 115B. The image data 260A is generated, for example, by encoding the one or more pieces of image data 125A. The sending section 270 generates the transmission data 270A and sends the transmission data 270A to the external system 300 through the transmission path 500, for example, in accordance with a rule defined by a transmission standard such as GigE.

(Data Transmission)

Figure 4:
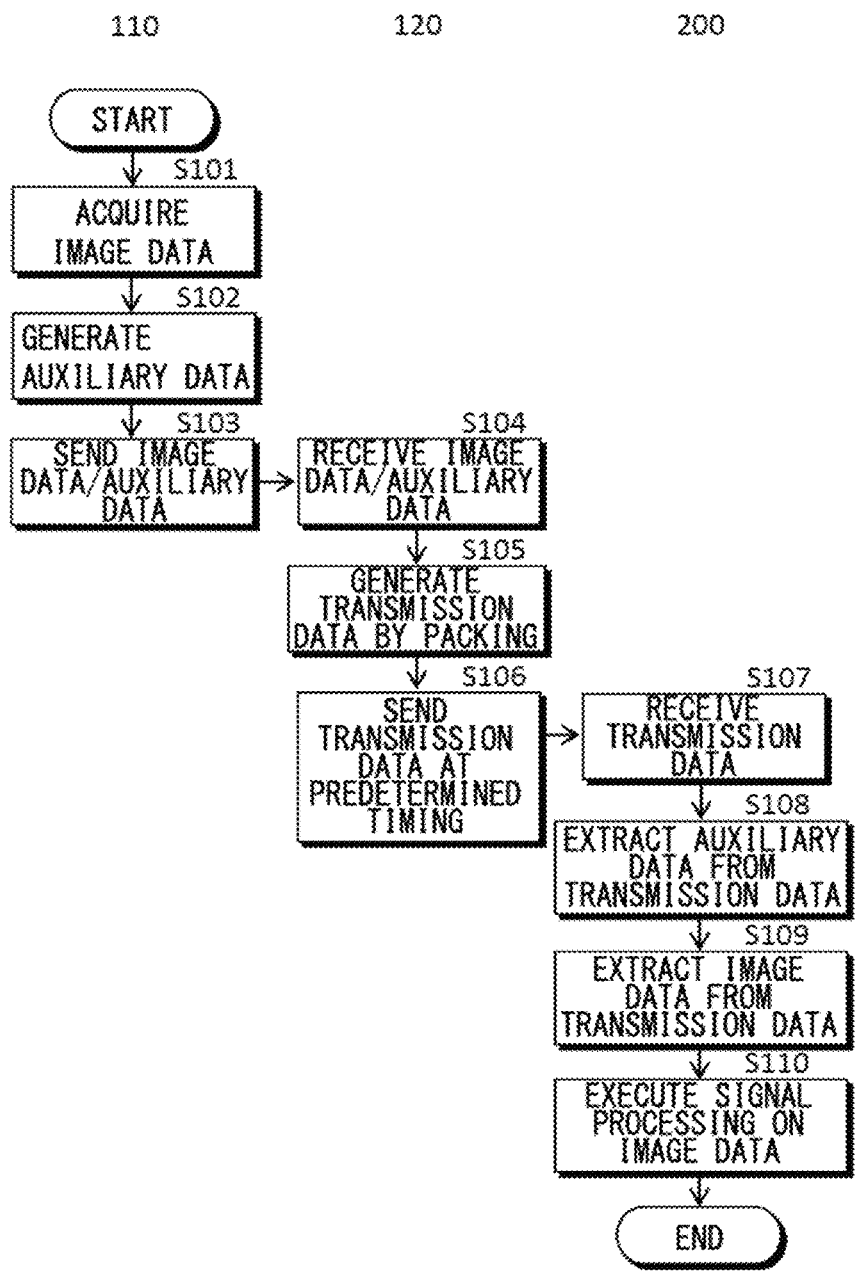
FIG. 4 is a diagram illustrating an example of a data transmission procedure of the embedded vision system.
Figure 5:
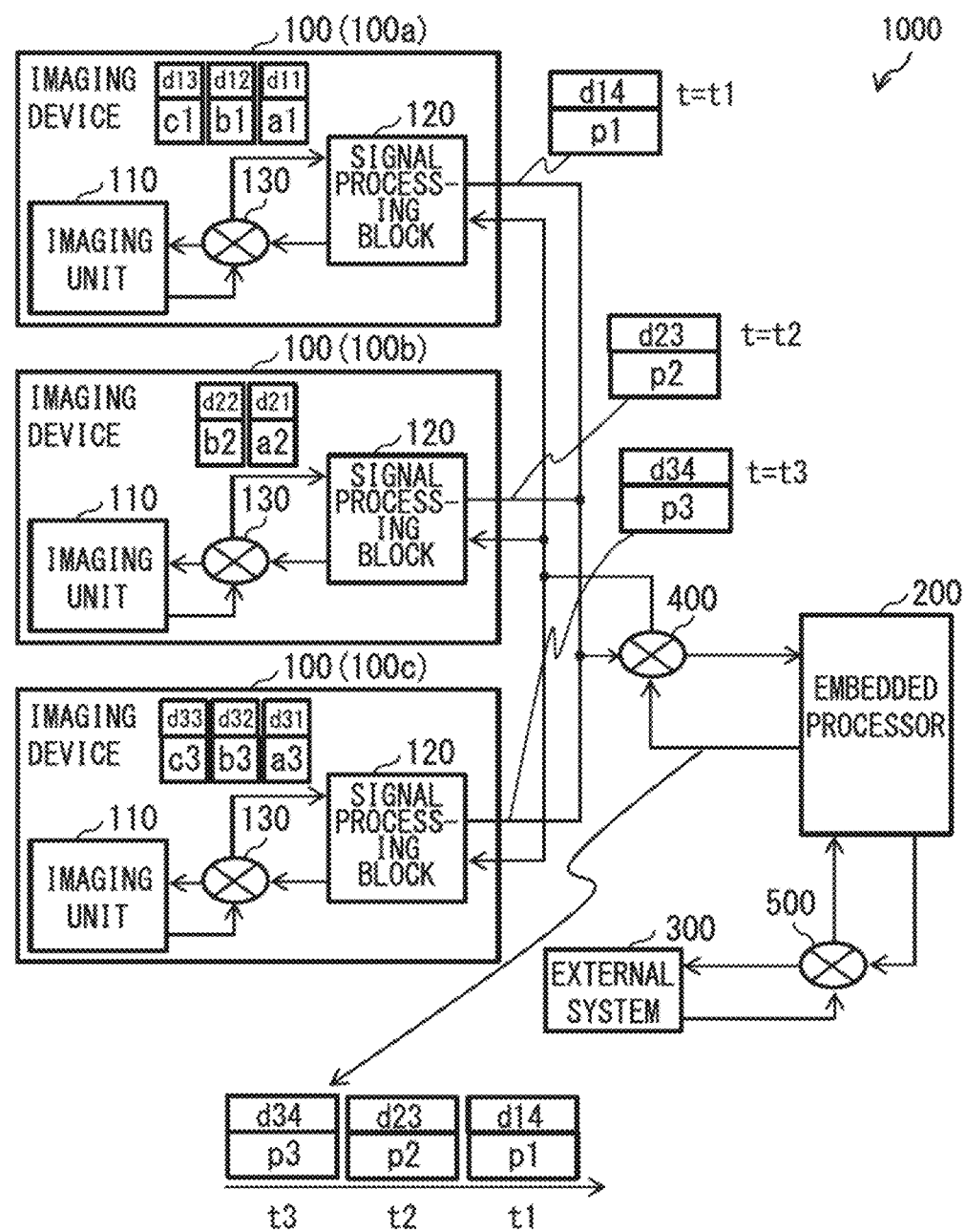
FIG. 5 is a diagram schematically illustrating data generation/data transmission by each of the imaging devices.
Figure 6A:
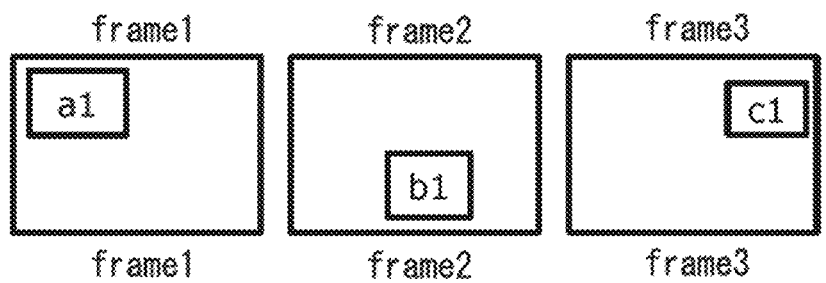
FIGS. 6A, 6B, and 6C are diagrams illustrating an example of image data obtained by each of the imaging devices.
Figure 6B:
Figure 6C:
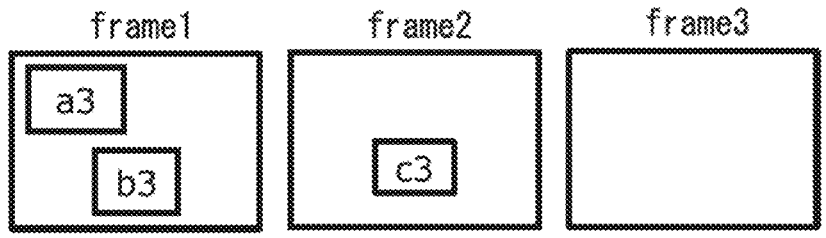

FIG. 4 illustrates an example of a data transmission procedure of the embedded vision system 1000 according to the present embodiment. FIG. 5 schematically illustrates the data generation/data transmission by each of the imaging devices 100. FIGS. 6A, 6B, and 6C illustrates an example of image data obtained by each of the imaging devices 100. FIG. 6A illustrates respective examples of pieces of image data obtained by the imaging device 100a at different imaging timings. FIG. 6B illustrates respective examples of pieces of image data obtained by the imaging device 100b at different imaging timings. FIG. 6C illustrates respective examples of pieces of image data obtained by the imaging device 100c at different imaging timings.

First, the imaging unit 110 of each of the imaging devices 100 (100a, 100b, and 100c) acquires the image data 111A by imaging based on a predetermined exposure timing and frame rate. The imaging unit 110 of each of the imaging devices 100 (100a, 100b, and 100c) acquires pieces of image data (the pieces of ROI image data 112A) of one or more ROIs from the image data 111A acquired by the imaging element 111 on the basis of the position of a determined ROI (step S101). The imaging unit 110 of each of the imaging devices 100 (100a, 100b, and 100c) further generates the auxiliary data 115B for each piece of ROI image data 112A (step S102). The imaging unit 110 of each of the imaging devices 100 (100a, 100b, and 100c) sends the ROI image data 112A and the auxiliary data 115B regarding the ROI image data 112A to the signal processing block 120 (step S103).

For example, it is assumed that the imaging unit 110 of the imaging device 100a obtains three pieces of ROI image data a1, b1, and c1 and pieces of auxiliary data d11, d12, and d13 regarding the three pieces of ROI image data a11, b1, and c1 from the three pieces of image data 111A (frame1, frame2, and frame3) obtained at different imaging timings. The ROI image data a1 is a portion of the image data 111A of frame1. The ROI image data b1 is a portion of the image data 111A of frame2. The ROI image data c1 is a portion of the image data 111A of frame3. In this case, the imaging unit 110 of the imaging device 100a sequentially sends, for example, the one set of the ROI image data a1 and the auxiliary data d11, the one set of the ROI image data b1 and the auxiliary data d12, and the one set of the ROI image data c1 and the auxiliary data d13 to the signal processing block 120.

For example, it is assumed that the imaging unit 110 of the imaging device 100b obtains two pieces of ROI image data a2 and b2 and pieces of auxiliary data d21 and d22 regarding the two pieces of ROI image data a2 and b2 from the three pieces of image data 111A (frame1, frame2, and frame3) obtained at different imaging timings. The ROI image data a2 is a portion of the image data 111A of frame1. The ROI image data b2 is a portion of the image data 111A of frame3. In this case, the imaging unit 110 of the imaging device 100b sequentially sends, for example, the one set of the ROI image data a2 and the auxiliary data d21 and the one set of the ROI image data b2 and the auxiliary data d22 to the signal processing block 120.

For example, it is assumed that the imaging unit 110 of the imaging device 100c obtains three pieces of ROI image data a3, b3, and c3 and pieces of auxiliary data d31, d32, and d33 regarding the three pieces of ROI image data a3, b3, and c3 from the three pieces of image data 111A (frame1, frame2, and frame3) obtained at different imaging timings. The ROI image data a3 is a portion of the image data 111A of frame1. The ROI image data b3 is a portion of the image data 111A of frame1. The ROI image data c3 is a portion of the image data 111A of frame2. In this case, the imaging unit 110 of the imaging device 100c sequentially sends, for example, the one set of the ROI image data a3 and the auxiliary data d31, the one set of the ROI image data b3 and the auxiliary data d32, and the one set of the ROI image data c3 and the auxiliary data d33 to the signal processing block 120.

Next, the signal processing block 120 of each of the imaging devices 100 (100a, 100b, and 100c) receives the ROI image data 112A and the auxiliary data 115B regarding the ROI image data 112A from the imaging unit 110 (step S104). The signal processing block 120 of each of the imaging devices 100 (100a, 100b, and 100c) makes the output data size adjustment described above, thereby selecting the one or more pieces of image data 125A. The signal processing block 120 of each of the imaging devices 100 (100a, 100b, and 100c) further encodes the one or more selected pieces of image data 125A as one piece of image data for transmission (transmission data 116A). In other words, the signal processing block 120 generates the transmission data 116A by encoding (step S105).

Next, the signal processing block 120 of each of the imaging devices 100 (100a, 100b, and 100c) sends the transmission data 129A to the embedded processor 200 through the transmission path 400 at an output timing indicated by the control section 126 (step S106). Here, in a case where the three imaging devices 100 (100a, 100b, and 100c) are coupled to the transmission path 400, the signal processing block 120 of the imaging device 100a sends the transmission data 129A (image data p1 and auxiliary data d14) to the embedded processor 200 through the transmission path 400, for example, at the time t1. The image data p1 is data obtained by encoding the pieces of ROI image data a1, b1, and c1. The auxiliary data d14 is data including the pieces of auxiliary data d11, d12, and d13.

Further, the signal processing block 120 of the imaging device 100b sends the transmission data 129A (image data p2 and auxiliary data d23) to the embedded processor 200 through the transmission path 400, for example, at the time t2 a predetermined time after the time t1. The image data p2 is data obtained by encoding the pieces of ROI image data a2 and b2. The auxiliary data d23 is data including the pieces of auxiliary data d21 and d22. Further, the signal processing block 120 of the imaging device 100c sends the transmission data 129A (image data p3 and the auxiliary data d33) to the embedded processor 200 through the transmission path 400, for example, at time t3 a predetermined time after the time t2. The image data p3 is data obtained by encoding the pieces of ROI image data a3, b3, and c3. The auxiliary data d34 is data including the pieces of auxiliary data d31, d32, and d33.

Next, the embedded processor 200 sequentially receives the transmission data 129A (the image data p2 and the auxiliary data d23), the transmission data 129A (the image data p2 and the auxiliary data d23), and the transmission data 129A (the image data p3 and the auxiliary data d33) from the respective imaging devices 100 (100a, 100b, and 100c) through the transmission path 400 (step S107).

Next, the embedded processor 200 extracts the auxiliary data from each the received pieces of transmission data 129A (step S108). Further, the embedded processor 200 extracts the image data from each the received pieces of transmission data 129A (step S109). The embedded processor 200 decodes image data and performs predetermined signal processing on image data obtained by decoding (step S110). In this way, data is transmitted by the embedded vision system 1000 according to the present embodiment.

Figure 7:
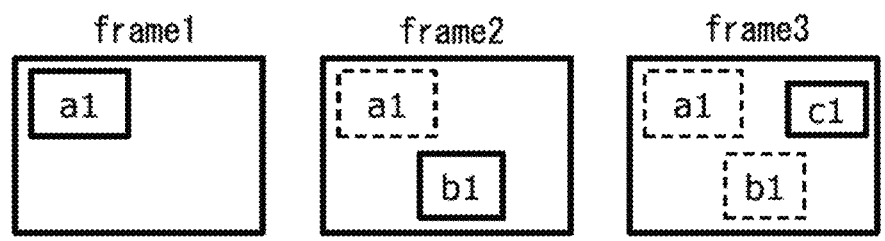
FIG. 7 is a diagram illustrating an example of image data obtained by one imaging device.
Figure 8:
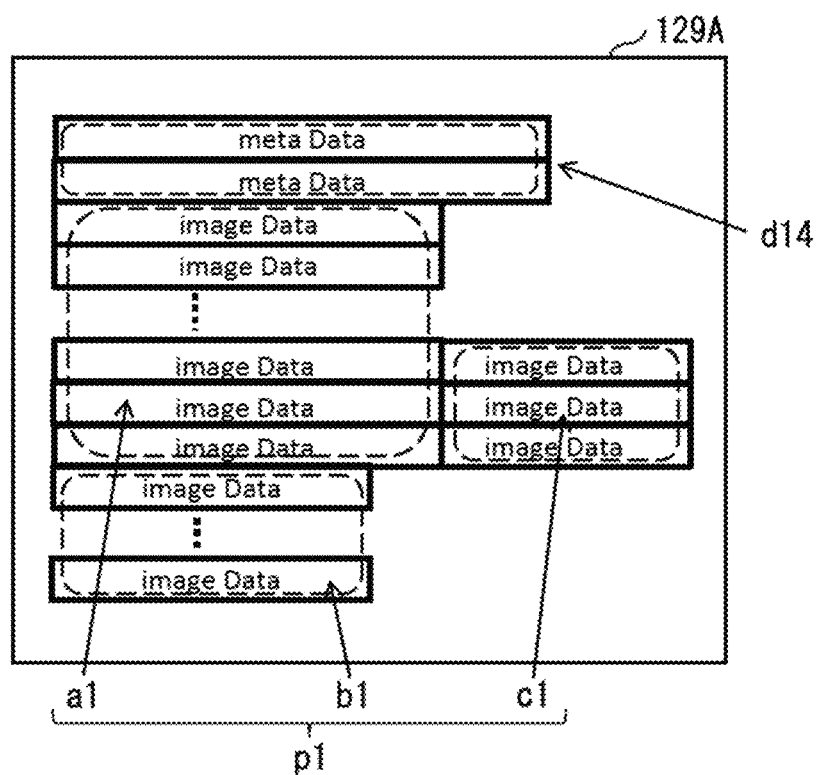
FIG. 8 is a diagram illustrating an example of encoding of the image data in FIG. 7.

FIG. 7 illustrates an example of image data obtained by the one imaging device 100. FIG. 7 illustrates respective examples of pieces of image data obtained by the imaging device 100a at different imaging timings. As illustrated in FIG. 7, the ROI image data a1, the ROI image data b1, and the ROI image data c1 have positions that do not overlap with each other. FIG. 8 illustrates an example of the encoding of the image data in FIG. 7. It is to be noted that FIG. 8 illustrates an example of the transmission data 129A in a case where encoding is performed in accordance with a rule defined by SROI (Smart Region Of Interest) in the MIPI CSI-2 standard or the MIPI CSI-3 standard.

The transmission data 129A includes, for example, a data frame as illustrated in FIG. 8. The data frame typically includes a header region, a packet region, and a footer region. FIG. 8 omits the footer region for the sake of convenience. In the data frame, the header region includes EmbeddedData. EmbeddedData refers to additional information embeddable in the header or the footer of a data frame. In this case, EmbeddedData includes the auxiliary data d14 serving as meta data (metaData).

In addition, as illustrated in FIG. 8, in a data frame, the packet region includes PayloadData of LongPacket for each line. In addition, the packet region includes the image data p1. PayloadData of LongPacket in each line includes imageData for one line in the image data p1. FIG. 8 exemplifies a portion corresponding to the ROI image data a1, a portion corresponding to the ROI image data b1, and a portion corresponding to the ROI image data c1 in the image data p1. Here, the ROI image data a1, the ROI image data b1, and the ROI image data c1 have positions that do not overlap with each other. The portion corresponding to the ROI image data a1, the portion corresponding to the ROI image data b1, and the portion corresponding to the ROI image data c1 do not thus overlap with each other in the image data p1.

Figure 9:
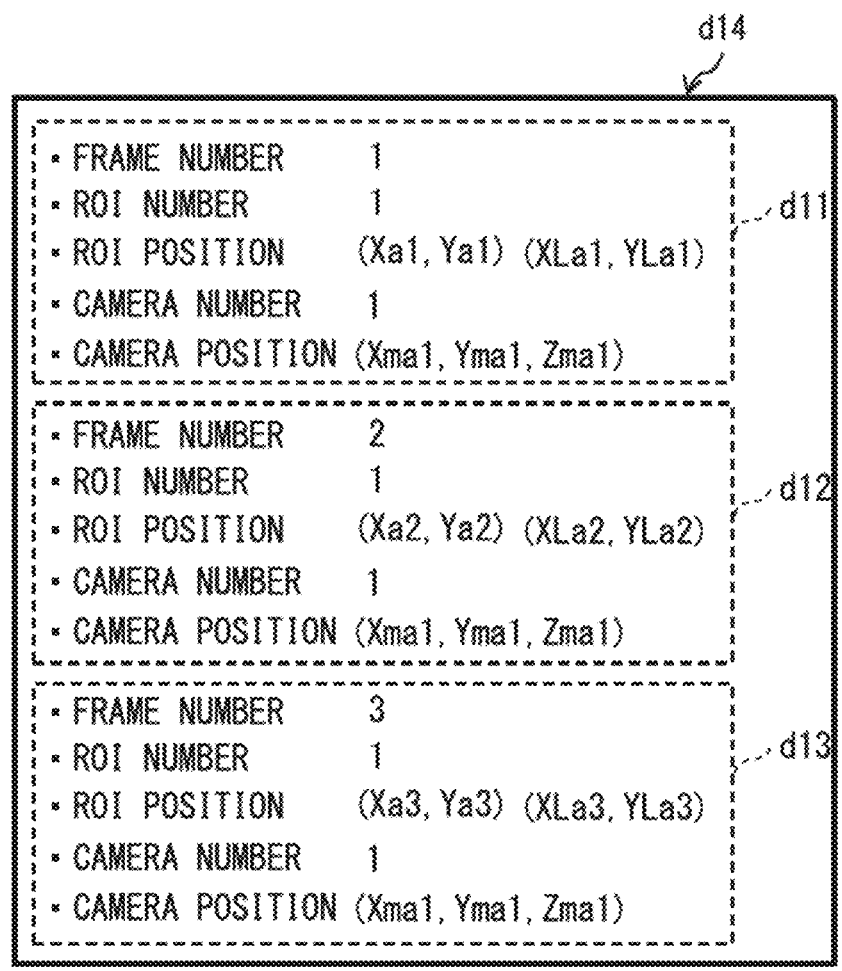
FIG. 9 is a diagram illustrating an example of data included in meta data in FIG. 8.

FIG. 9 illustrates an example of data included in meta data in FIG. 8. The auxiliary data d14 includes the pieces of auxiliary data d11, d12, and d13, for example, as illustrated in FIG. 9. The auxiliary data d11 includes, for example, "1" as the frame number d1, "2" as the ROI number d2, "(Xa1, Ya1) (XLa1, YLa1)" as the ROI position d5, "1" as the camera number d3, and "(Xma1, Yma1, Zma1)" as the camera position d4. The auxiliary data d12 includes, for example, "2" as the frame number d1, "1" as the ROI number d2, "(Xa2, Ya2) (XLa2, YLa2)" as the ROI position d5, "1" as the camera number d3, and "(Xma1, Yma1, Zma1) as the camera position d4. The auxiliary data d13 includes, for example, "3" as the frame number d1, "1" as the ROI number d2, "(Xa3, Ya3) (XLa3, YLa3)" as the ROI position d5, "1" as the camera number d3, and "(Xma1, Yma1, Zma1) as the camera position d4.

Figure 10:
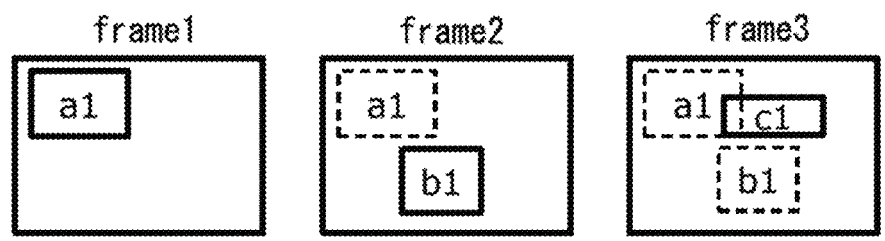
FIG. 10 is a diagram illustrating an example of image data obtained by one imaging device.
Figure 11:
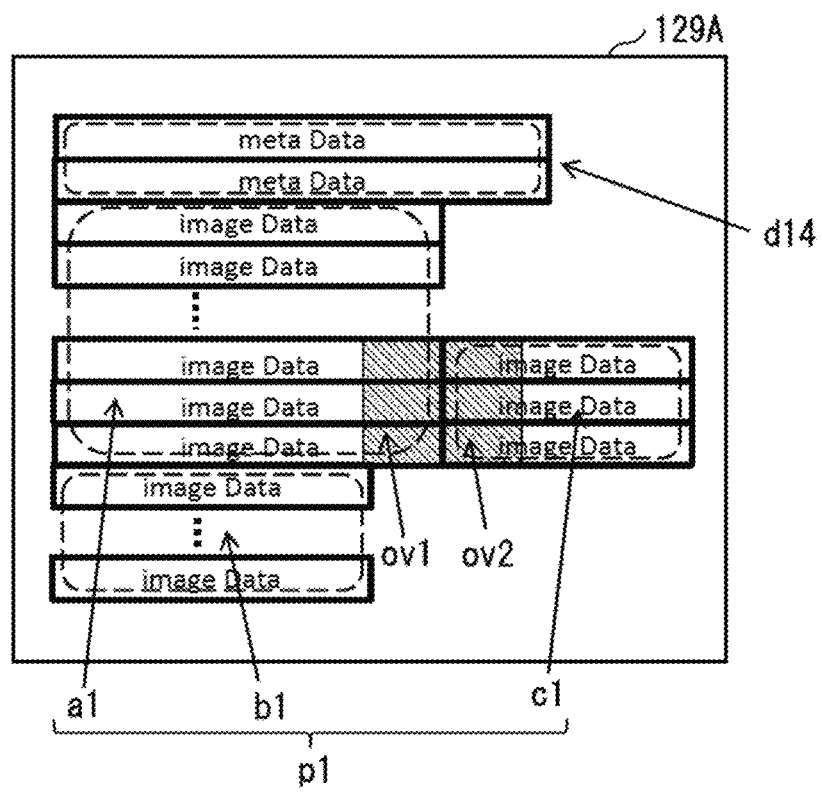
FIG. 11 is a diagram illustrating an example of encoding of the image data in FIG. 10.

FIG. 10 illustrates an example of image data obtained by the one imaging device 100. FIG. 10 illustrates respective examples of pieces of image data obtained by the imaging device 100a at different imaging timings. As illustrated in FIG. 10, the ROI image data a1 and the ROI image data b1 have positions that do not overlap with each other. The ROI image data b1 and the ROI image data c1 have positions that do not overlap with each other. The ROI image data a1 and the ROI image data c1 have positions that partially overlap with each other. FIG. 11 illustrates an example of the encoding of the image data in FIG. 10. It is to be noted that FIG. 11 illustrates an example of the transmission data 129A in a case where encoding is performed in accordance with a rule defined by SROI (Smart Region Of Interest) in the MIPI CSI-2 standard or the MIPI CSI-3 standard.

The transmission data 129A includes, for example, a data frame as illustrated in FIG. 11. The data frame typically includes a header region, a packet region, and a footer region. FIG. 11 omits the footer region for the sake of convenience. In the data frame, the header region includes EmbeddedData. EmbeddedData includes the auxiliary data d14 serving as meta data (metaData).

In addition, as illustrated in FIG. 11, in a data frame, the packet region includes PayloadData of LongPacket for each line. In addition, the packet region includes the image data p1. PayloadData of LongPacket in each line includes image-Data for one line in the image data p1. FIG. 11 exemplifies a case where the image data p1 includes image data corresponding to the ROI image data a1, image data corresponding to the ROI image data b1, and image data corresponding to the ROI image data c1.

Here, the ROI image data a1 and the ROI image data c1 have positions that partially overlap with each other. The imaging timings of the ROI image data a1 and the ROI image data c1 are, however, different from each other. In such a case, image data ov1 of a portion of the ROI image data a1 overlapping with the ROI image data c1 and image data ov2 of a portion of the ROI image data c1 overlapping with the ROI image data a1 do not completely match each other. In a case where any one of the image data ov1 and the image data ov2 is omitted to reduce the amount of transmission data, it is thus not possible to restore any of the ROI image data a1 and the ROI image data c1. In the present embodiment, none of the image data ov1 and the image data ov2 are thus omitted, but the image data ov1 and the image data ov2 are included in the image data frame. In other words, in a case where the ROI positions d5 of the plurality of respective pieces of image data 125A selected by making the output data size adjustment described above overlap with each other, the image processing section 127 outputs data that does not omit, but includes the image data of the overlapping portion to the encoding section 260.

It is to be noted that, in a case where the ROI image data a1 and the ROI image data c1 have positions that partially overlap with each other, the imaging device 100 may generate the image data 115A without omitting any of the image data ov1 and the image data ov2 and send the image data 115A to the embedded processor 200 and the embedded processor 200 may generate (restore), from the image data 115A received from the imaging device 100, the ROI image data a1 and the ROI image data c1 in which any of the image data ov1 and the image data ov2 is omitted.

Figure 12:
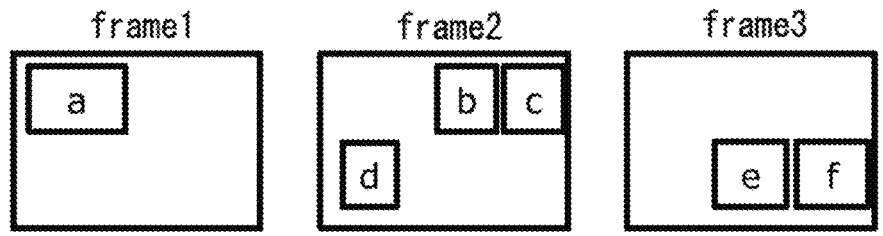
FIG. 12 is a diagram illustrating an example of image data obtained by one imaging device.

FIG. 12 illustrates an example of image data obtained by the one imaging device 100. FIG. 12 illustrates the three pieces of image data 111A (frame1, frame2, and frame3) obtained at different imaging timings. It is assumed that six pieces of ROI image data a, b, c, d, e, and f are obtained from the three pieces of image data 111A (frame1, frame2, and frame3) at positions that do not overlap with each other as illustrated in FIG. 12. The ROI image data a is a portion of the image data 111A of frame1. Each of the pieces of ROI image data b, c, and d is a portion of the image data 111A of frame2. Each of the pieces of ROI image data e and f is a portion of the image data 111A of frame3.

Figure 13:
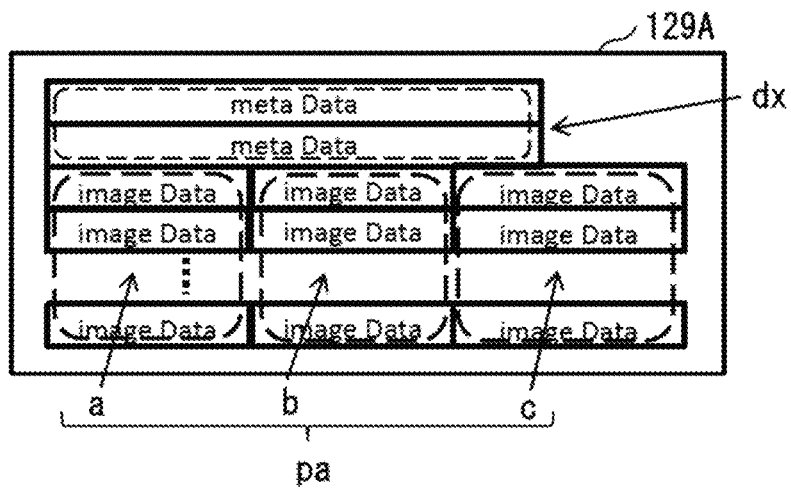
FIG. 13 is a diagram illustrating an example of encoding of the image data in FIG. 12.
Figure 14:
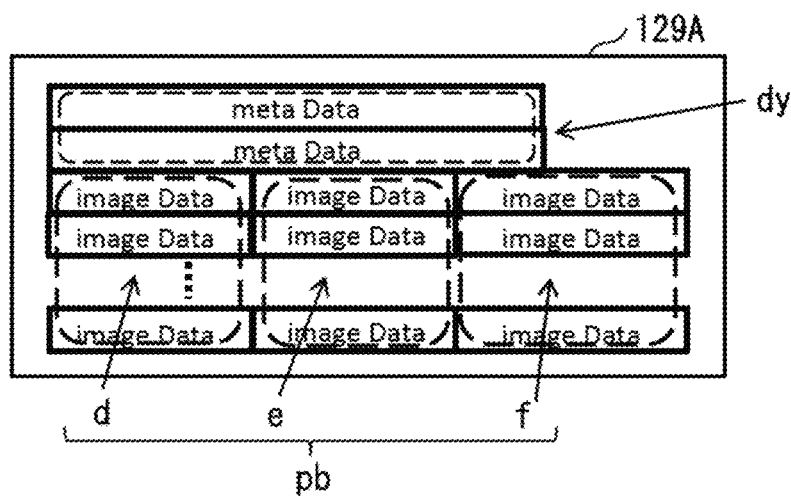
FIG. 14 is a diagram illustrating an example of encoding of the image data in FIG. 12.

Each of FIGS. 13 and 14 illustrates an example of the encoding of the image data in FIG. 12. It is to be noted that each of FIGS. 13 and 14 illustrates an example of the transmission data 129A in a case where encoding is performed in accordance with a rule defined by SROI (Smart Region Of Interest) in the MIPI CSI-2 standard or the MIPI CSI-3 standard. FIGS. 13 and 14 illustrate an example in which the three pieces of ROI image data a, b, and c and the three pieces of ROI image data d, e, and f are assigned to the different pieces of transmission data 129A by making the output data size adjustment described above.

For example, as illustrated in FIG. 13, one of the pieces of transmission data 129A includes image data pa obtained by encoding the three pieces of ROI image data a, b, and c and auxiliary data dx regarding the three pieces of ROI image data a, b, and c. The header region includes the auxiliary data dx serving as meta data (metaData). The packet region includes the image data pa. The three pieces of ROI image data a, b, and c have positions that do not overlap with each other. The portion corresponding to the ROI image data a, the portion corresponding to the ROI image data b, and the portion corresponding to the ROI image data c do not thus overlap with each other in the image data pa.

For example, as illustrated in FIG. 14, the other piece of transmission data 129A includes image data pb obtained by encoding the three pieces of ROI image data d, e, and f and auxiliary data dy regarding the three pieces of ROI image data d, e, and f. The header region includes the auxiliary data dy serving as meta data (metaData). The packet region includes the image data pb. The three pieces of ROI image data d, e, and f have positions that do not overlap with each other. The portion corresponding to the ROI image data d, the portion corresponding to the ROI image data e, and the portion corresponding to the ROI image data f do not thus overlap with each other in the image data pb.

FIG. 15 illustrates an example of data included in meta data in FIG. 13. The auxiliary data dx includes pieces of auxiliary data da, db, and dc, for example, as illustrated in FIG. 15. The auxiliary data da is auxiliary data regarding the ROI image data a. The auxiliary data db is auxiliary data regarding the ROI image data b. The auxiliary data dc is auxiliary data regarding the ROI image data c. The auxiliary data da includes, for example, "1" as the frame number d1, "1" as the ROI number d2, "(Xa1, Ya1) (XLa1, YLa1)" as the ROI position d5, "1" as the camera number d3, and "(Xma1, Yma1, Zma1) as the camera position d4. The auxiliary data db includes, for example, "2" as the frame number d1, "1" as the ROI number d2, "(Xa2, Ya2) (XLa2, YLa2)" as the ROI position d5, "1" as the camera number d3, and "(Xma1, Yma1, Zma1) as the camera position d4. The auxiliary data dc includes, for example, "2" as the frame number d1, "2" as the ROI number d2, "(Xa3, Ya3) (XLa3, YLa3)" as the ROI position d5, "1" as the camera number d3, and "(Xma1, Yma1, Zma1) as the camera position d4.

Figure 16:
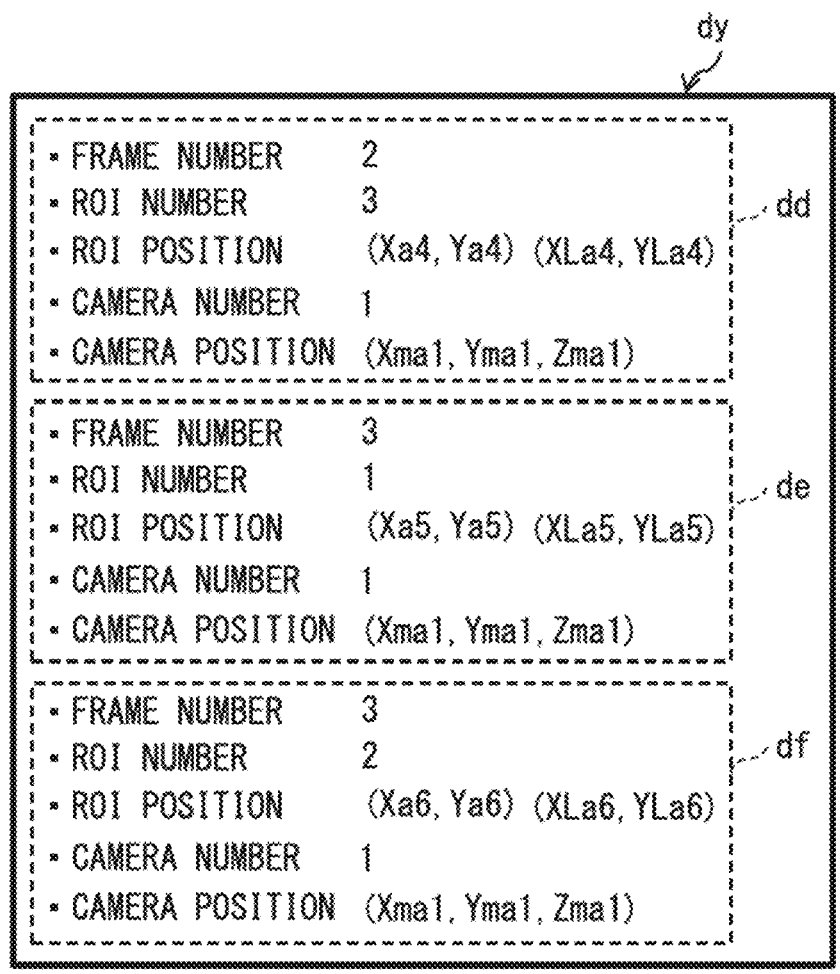
FIG. 16 is a diagram illustrating an example of data included in meta data in FIG. 14.

FIG. 16 illustrates an example of data included in meta data in FIG. 14. The auxiliary data dy includes pieces of auxiliary data dd, de, and df, for example, as illustrated in FIG. 16. The auxiliary data dd is auxiliary data regarding the ROI image data d. The auxiliary data de is auxiliary data regarding the ROI image data e. The auxiliary data df is auxiliary data regarding the ROI image data f. The auxiliary data dd includes, for example, "2" as the frame number d1, "3" as the ROI number d2, "(Xa4, Ya4) (XLa4, YLa4)" as the ROI position d5, "1" as the camera number d3, and "(Xma1, Yma1, Zma1) as the camera position d4. The auxiliary data de includes, for example, "3" as the frame number d1, "1" as the ROI number d2, "(Xa5, Ya5) (XLa5, YLa5)" as the ROI position d5, "1" as the camera number d3, and "(Xma1, Yma1, Zma1) as the camera position d4. The auxiliary data df includes, for example, "3" as the frame number d1, "2" as the ROI number d2, "(Xa6, Ya6) (XLa6, YLa6)" as the ROI position d5, "1" as the camera number d3, and "(Xma1, Yma1, Zma1) as the camera position d4.

Figure 17:
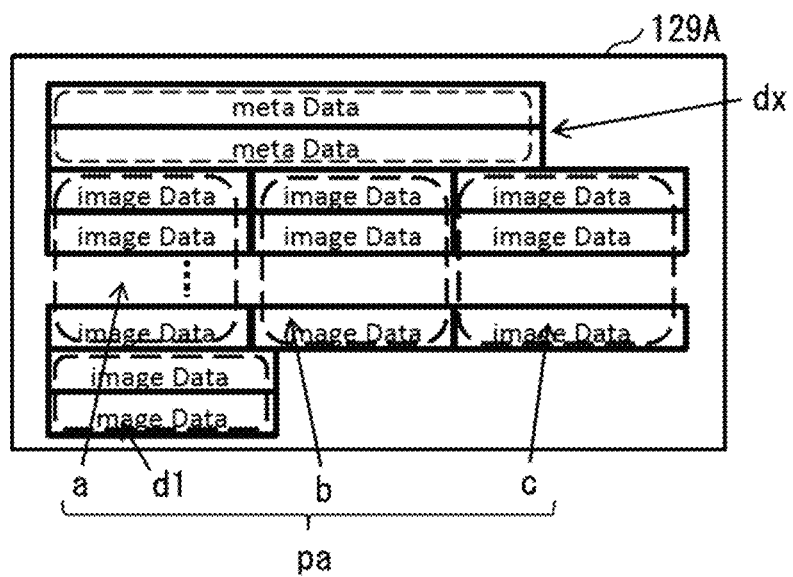
FIG. 17 is a diagram illustrating an example of encoding of the image data in FIG. 12.
Figure 18:
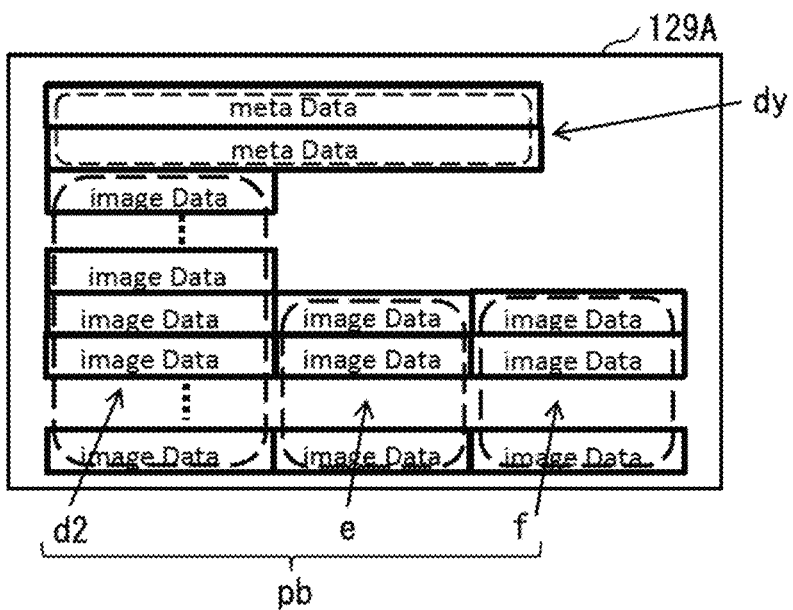
FIG. 18 is a diagram illustrating an example of encoding of the image data in FIG. 12.

Each of FIGS. 17 and 18 illustrates an example of the encoding of the image data in FIG. 12. It is to be noted that each of FIGS. 17 and 18 illustrates an example of the transmission data 129A in a case where encoding is performed in accordance with a rule defined by the MIPI CSI-2 standard or the MIPI CSI-3 standard. FIGS. 17 and 18 illustrate an example in which the pieces of ROI image data a, b, and c, a portion d1 of the ROI image data a, a portion d2 of the ROI image data a, and the pieces of ROI image data d, e, and f are assigned to the different pieces of transmission data 129A by making the output data size adjustment described above.

In other words, in this example, the image processing section 127 divides the one piece of image data 125A (e.g., the ROI image data 112A) into two pieces of image data (e.g., the two pieces of partial ROI image data) in making the output data size adjustment described above. The image processing section 127 separately outputs data D1 including one of the pieces of image data (e.g., one of the pieces of partial ROI image data) and data D2 including the other piece of image data (e.g., one of the pieces of partial ROI image data) to the encoding section 260. The sending section 129 generates the transmission data 129A as illustrated in FIG. 17 by using image data obtained by encoding the data D1. The sending section 129 generates the transmission data 129A as illustrated in FIG. 18 by using image data obtained by encoding the data D2.

Figure 19:
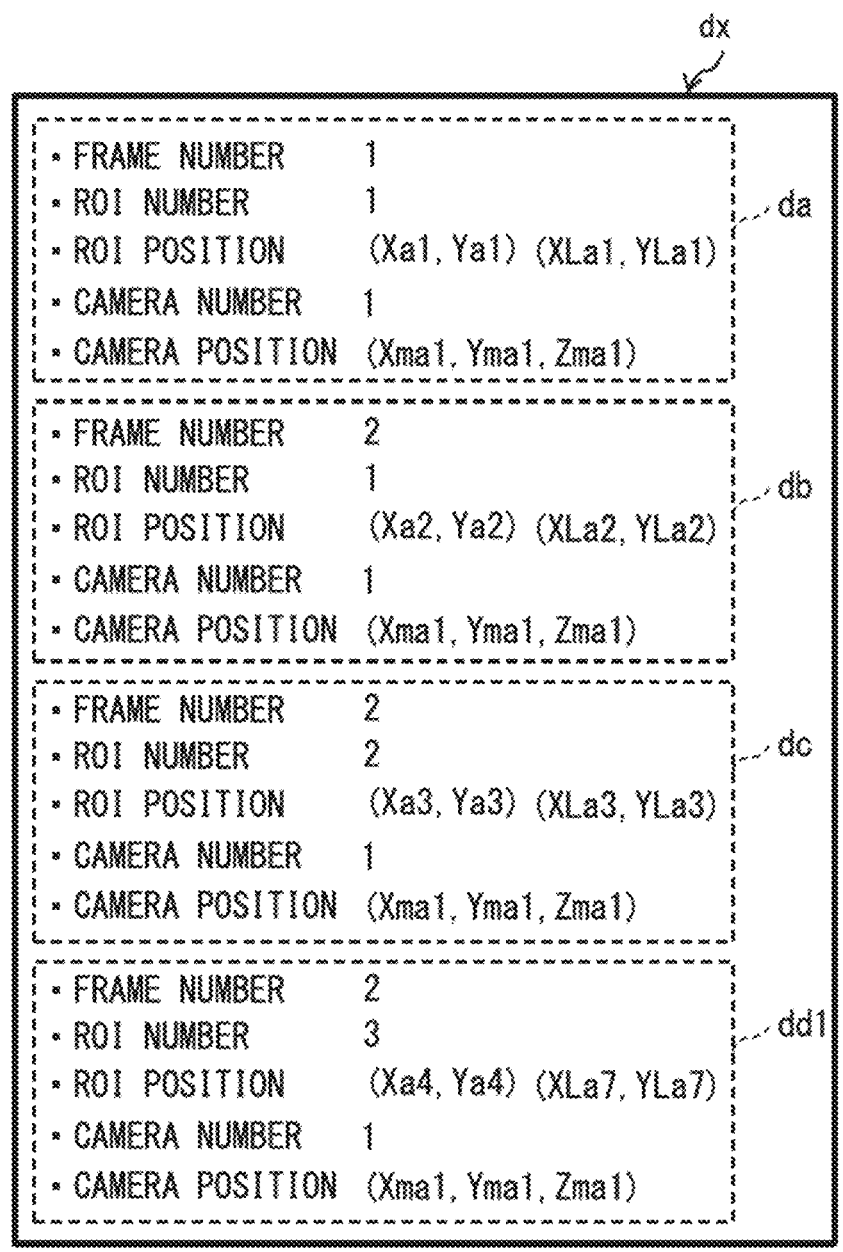
FIG. 19 is a diagram illustrating an example of data included in meta data in FIG. 17.

FIG. 19 illustrates an example of data included in meta data in FIG. 17. The auxiliary data dx includes the pieces of auxiliary data da, db, dc, and dd1 for example, as illustrated in FIG. 19. The auxiliary data dd1 is auxiliary data regarding partial ROI image data that is a portion of the ROI image data a. The auxiliary data dd1 includes, for example, "2" as the frame number d1, "3" as the ROI number d2, "(Xa4, Ya4) (XLa7, YLa7)" as the ROI position d5, "1" as the camera number d3, and "(Xma1, Yma1, Zma1) as the camera position d4.

FIG. 20 illustrates an example of data included in meta data in FIG. 18. The auxiliary data dy includes pieces of auxiliary data dd2, de, and df, for example, as illustrated in FIG. 20. The auxiliary data dd2 is auxiliary data regarding partial ROI image data that is a portion of the ROI image data a. The auxiliary data dd2 includes, for example, "2" as the frame number d1, "3" as the ROI number d2, "(Xa8, Ya8) (XLa8, YLa8)" as the ROI position d5, "1" as the camera number d3, and "(Xma1, Yma1, Zma1) as the camera position d4.

[Effects]

Next, effects of the embedded vision system 1000 according to the present embodiment are described.

Technology has been developed that is related, for example, to the coupling between devices such as the coupling between a processor and a sensor. For example, as electronic apparatuses each have higher performance, more functions, and the like, some of electronic apparatuses each including a processing device such as a processor include a plurality of imaging devices. For example, the technology described in PTL 1 shifts the output timings (that are referred to simply as "output timings of the respective imaging devices") of pieces of image data from the respective imaging devices and multiplexes signals by the processing device to achieve one-to-one coupling between an imaging device and the processing device. Such one-to-one coupling has the problem that, for example, in a case where the sizes of pieces of image data outputted from the respective imaging devices, the frame rates of the respective imaging devices or the exposure timings of the respective imaging devices, or the like are different between the imaging devices, it is difficult to control the output timings of the respective imaging devices by simply shifting the output timings of the respective imaging devices.

In contrast, the imaging device 100 according to the present embodiment encodes the one or more pieces of image data 111A and the plurality of pieces of image data 122A that is a portion of the one or more pieces of ROI image data 112A extracted from the one or more pieces of image data 111A as the image data 115A and sends the encoded image data 115A to the embedded processor 200. This makes it possible to control, in a case where the imaging device 100 is coupled to the transmission path 400 common to the other one or more imaging devices, a data output timing of the imaging device 100 to offer a timing that is appropriate in relation to data output timings of the other one or more imaging devices coupled to the common transmission path 400.

In addition, the imaging device 100 according to the present embodiment sends the transmission data 129A (the image data 128A) to the embedded processor 200 at a timing based on a first control signal inputted from the embedded processor 200. This makes it possible to control data output timings of the respective imaging devices 100 to offer timings that are appropriate in relation to data output timings of the other one or more imaging devices 100 coupled to the common transmission path 400.

In addition, the imaging device 100 according to the present embodiment performs encoding to bring the predetermined data size described above closer to a data size inputted from the control section 126. This makes it possible to control data output timings of the respective imaging devices 100 to offer timings that are appropriate in relation to data output timings of the other one or more imaging devices 100 coupled to the common transmission path 400.

In addition, the imaging device 100 according to the present embodiment generates the one or more pieces of auxiliary data 115B regarding the one or more pieces of image data 125A and sends the one or more pieces of auxiliary data 115B to the embedded processor 200 along with the image data 128A. Each of the pieces of auxiliary data 115B includes, for example, the frame number d1, the ROI number d2, the camera number d3, and the ROI position d5. This makes it possible to control data output timings of the respective imaging devices 100 to offer timings that are appropriate in relation to data output timings of the other one or more imaging devices 100 coupled to the common transmission path 400.

In addition, in the imaging device 100 according to the present embodiment, the auxiliary data 115B includes the positional data (the camera position d4) of the imaging device 100. This makes it possible to perform, for example, image processing corresponding to the position of the imaging device 100.

In addition, in a case where the ROI positions d5 of the plurality of respective pieces of image data 125A selected by making the output data size adjustment described above overlap with each other, the imaging device 100 according to the present embodiment performs encoding by including the image data of the overlapping portion without omitting the image data of the overlapping portion. This makes it possible to restore all of the pieces of image data 125A even in a case where all of the imaging timings of the plurality of pieces of image data 125A are not equal.

In addition, in this example, the imaging device 100 according to the present embodiment divides the one piece of image data 125A (e.g., the ROI image data 112A) into two pieces of image data (e.g., the two pieces of partial ROI image data) in making the output data size adjustment described above. The imaging device 100 according to the present embodiment separately outputs the data D1 including one of the pieces of image data (e.g., one of the pieces of partial ROI image data) and the data D2 including the other piece of image data (e.g., one of the pieces of partial ROI image data) to the encoding section 128. This makes it possible to prevent the one or more pieces of image data 125A having greatly different data sizes to the encoding section 128 from being outputted whenever the one or more pieces of image data 125A are outputted to the encoding section 128. As a result, it is possible to control data output timings of the respective imaging devices 100 to offer timings that are appropriate in relation to data output timings of the other one or more imaging devices 100 coupled to the common transmission path 400.

In addition, the embedded processor 200 according to the present embodiment generates control signals for the sending timings of the pieces of transmission data 129A (the pieces of image data 128A) on the basis of the frame rate of the transmission path 400 and sends the control signals to the respective imaging devices 100. These control signals are signals defining sending timings that allow the pieces of transmission data 129A (the pieces of image data 128A) from the plurality of respective imaging devices 100 to be sequentially received through the transmission path 400. This makes it possible to control data output timings of the respective imaging devices 100 to offer timings that are appropriate in relation to data output timings of the other one or more imaging devices 100 coupled to the common transmission path 400.

In addition, the embedded processor 200 according to the present embodiment generates control signals each for a data size serving as an index for encoding on the basis of the frame rate of the transmission path 400 and sends the control signals to the respective imaging devices 100. These control signals are signals defining a data size that allows the pieces of transmission data 129A (the pieces of image data 128A) from the plurality of respective imaging devices 100 to be received at a predetermined frame rate. This makes it possible to control data output timings of the respective imaging devices 100 to offer timings that are appropriate in relation to data output timings of the other one or more imaging devices 100 coupled to the common transmission path 400.

In addition, the embedded processor 200 according to the present embodiment receives the pieces of transmission data 129A (the pieces of image data 128A) from the plurality of respective imaging devices 100 by using an interface standard in which one of the plurality of imaging devices 100 and the embedded processor 200 are coupled in a one-to-one manner. This eliminates the necessity to provide the respective imaging devices 100 with transmission paths. It is thus possible to minimize the circuit scale of the embedded processor 200 and miniaturize the embedded processor 200.

In addition, the embedded processor 200 according to the present embodiment acquires the one or more pieces of image data 125A from the transmission data 129A (the pieces of image data 128A) by decoding the received transmission data 129A (the image data 128A). Further, the one or more pieces of image data 125A acquired by decoding are encoded as the image data 260A and the image data 260A is sent to the external system 300 through the transmission path 500 having an interface standard different from the interface standard of the transmission path 400. This allows the embedded processor 200 to couple the two transmission paths 400 and 500 having interface standards different from each other.

<2. Modification Examples>
[Modification Example A]

Figure 21:
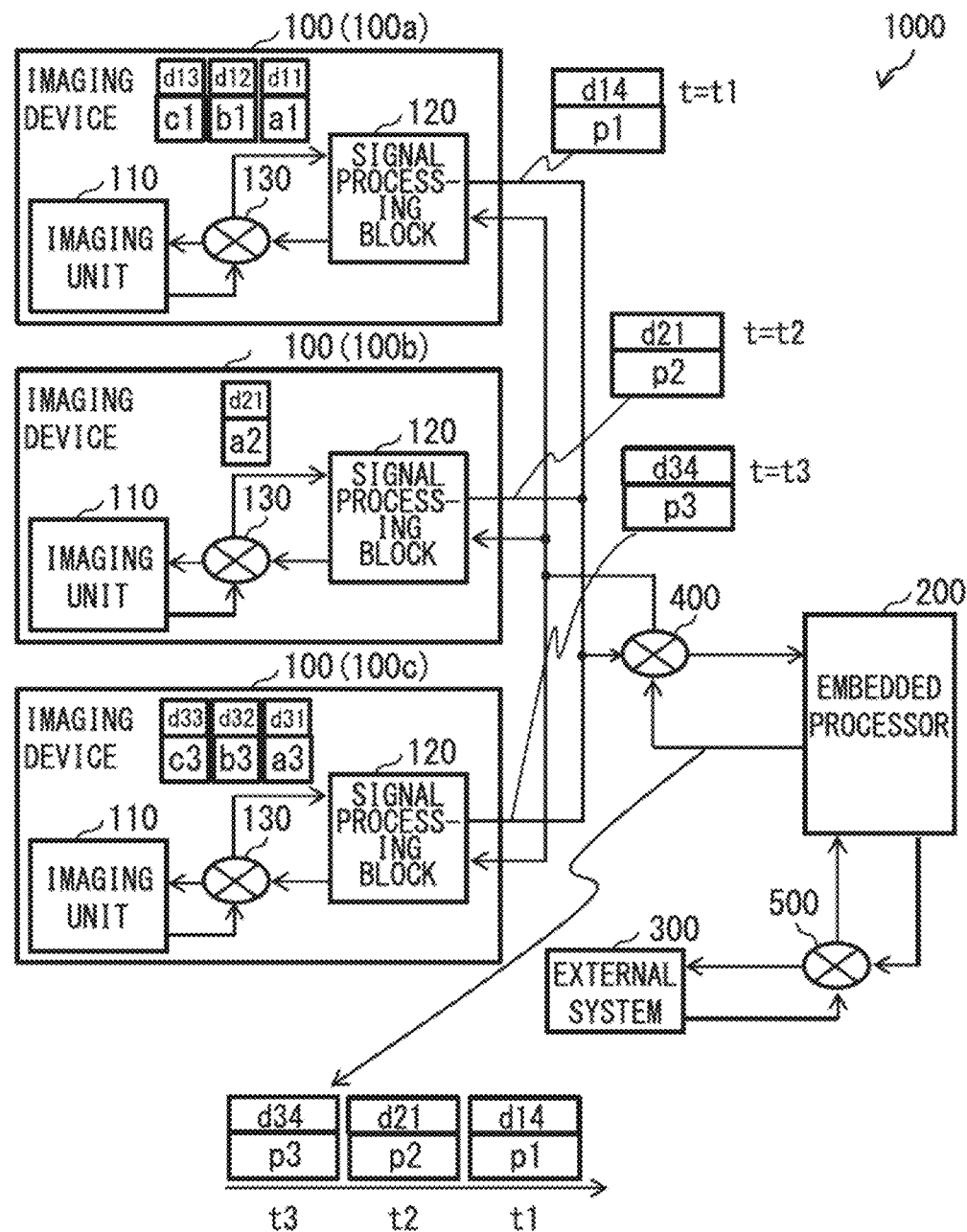
FIG. 21 is a diagram schematically illustrating data generation/data transmission by each of the imaging devices.
Figure 22A:
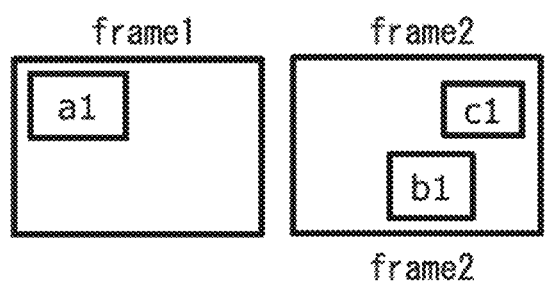
FIGS. 22A, 22B, and 22C are diagrams illustrating an example of image data obtained by each of the imaging devices.
Figure 22B:
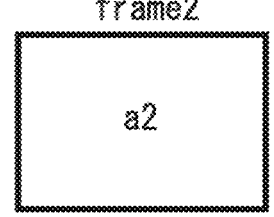
Figure 22C:
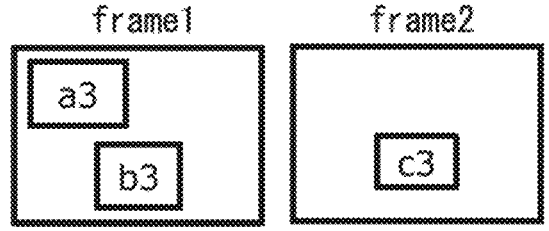

FIG. 21 schematically illustrates the data generation/data transmission by each of the imaging devices 100. FIGS. 22A, 22B, and 22C illustrates an example of image data obtained by each of the imaging devices 100. FIG. 22A illustrates respective examples of pieces of image data obtained by the imaging device 100a at different imaging timings. FIG. 22B illustrates respective examples of pieces of image data obtained by the imaging device 100b at different imaging timings. FIG. 22C illustrates respective examples of pieces of image data obtained by the imaging device 100c at different imaging timings.

In the embedded vision system 1000 according to the embodiment described above, at least the one imaging device 100 of the plurality of imaging devices 100 may transmit the transmission data 129A to the embedded processor 200 through the transmission path 400. The transmission data 129A includes the image data 115A obtained by encoding the entire image data 112B. For example, as illustrated in FIGS. 21, 22A, 22B, and 22C, the imaging device 100b that is one of the three imaging devices 100a, 100b, and 100c may transmit the transmission data 129A to the embedded processor 200 through the transmission path 400. The transmission data 129A includes the image data p2 obtained by encoding entire image data a2 and the auxiliary data d21 regarding the entire image data a2 that is the original data of the image data p2.

[Modification Example B]

Figure 23:
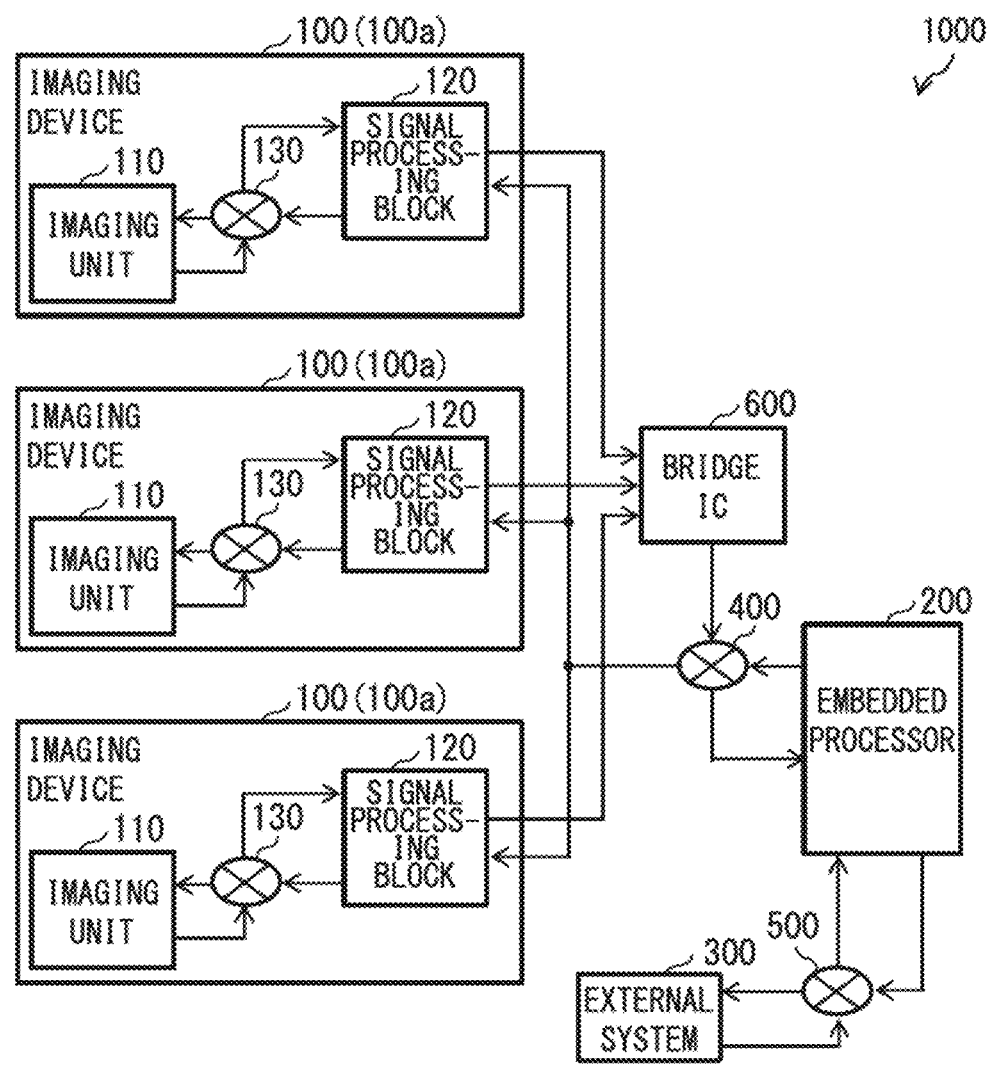
FIG. 23 is a diagram illustrating a modification example of the functional block of the embedded vision system.

FIG. 23 schematically illustrates a modification example of a functional block of the embedded vision system 1000. In the embedded vision system 1000 according to any of the embodiment described above and the modification example thereof, there may be provided bridge IC 600 in the transmission path 400.

The bridge IC 600 is provided between the plurality of imaging devices 100 and the embedded processor 200. The bridge IC 600 temporarily holds the pieces of transmission data 116A outputted from the plurality of respective imaging devices 100 and sequentially sends the plurality of pieces of transmission data 116A that has been primarily held to the embedded processor 200 through the transmission path 400 at predetermined timings.

(Data Transmission)

Figure 24:
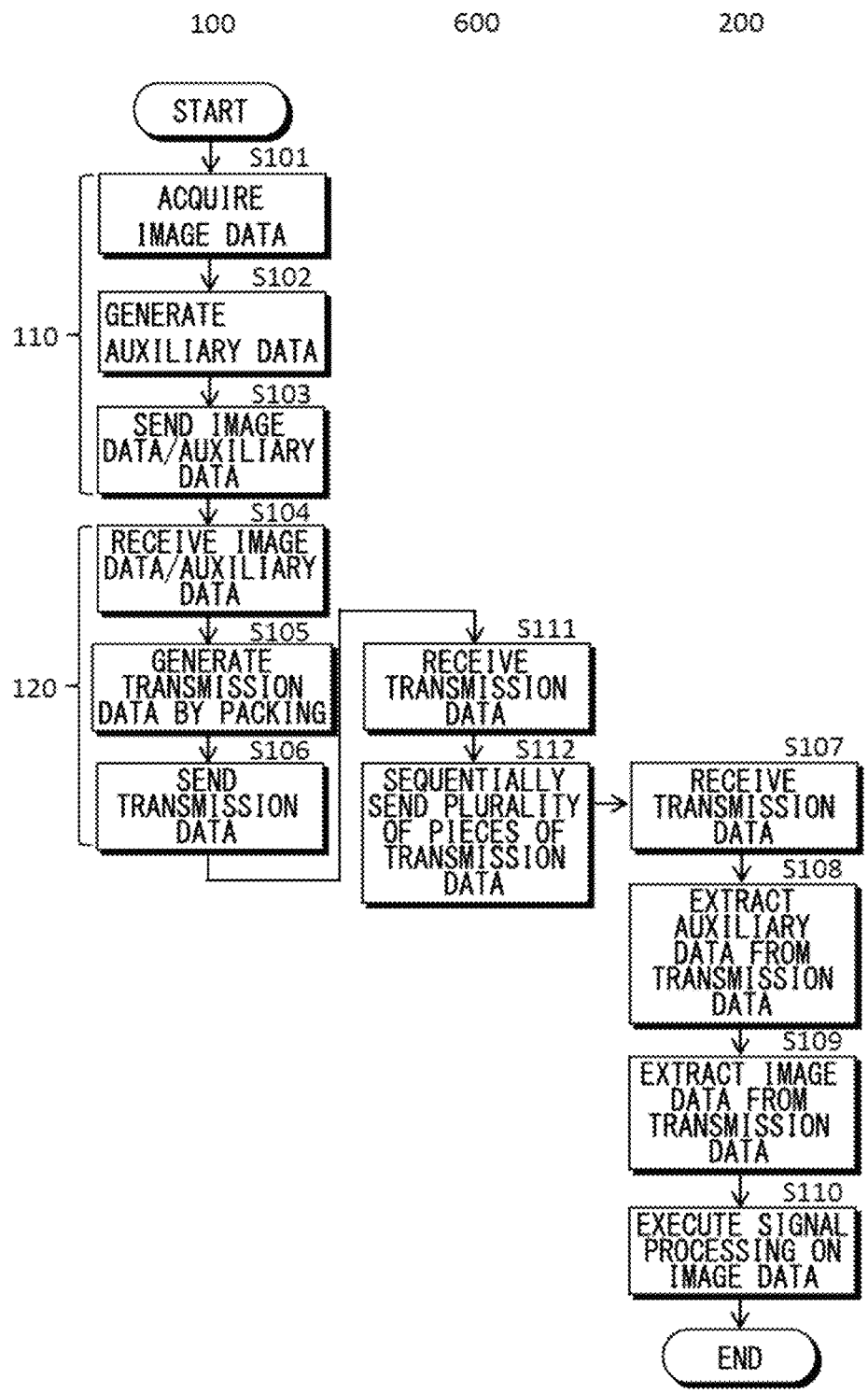
FIG. 24 is a diagram illustrating an example of the data transmission procedure of the embedded vision system.
Figure 25:
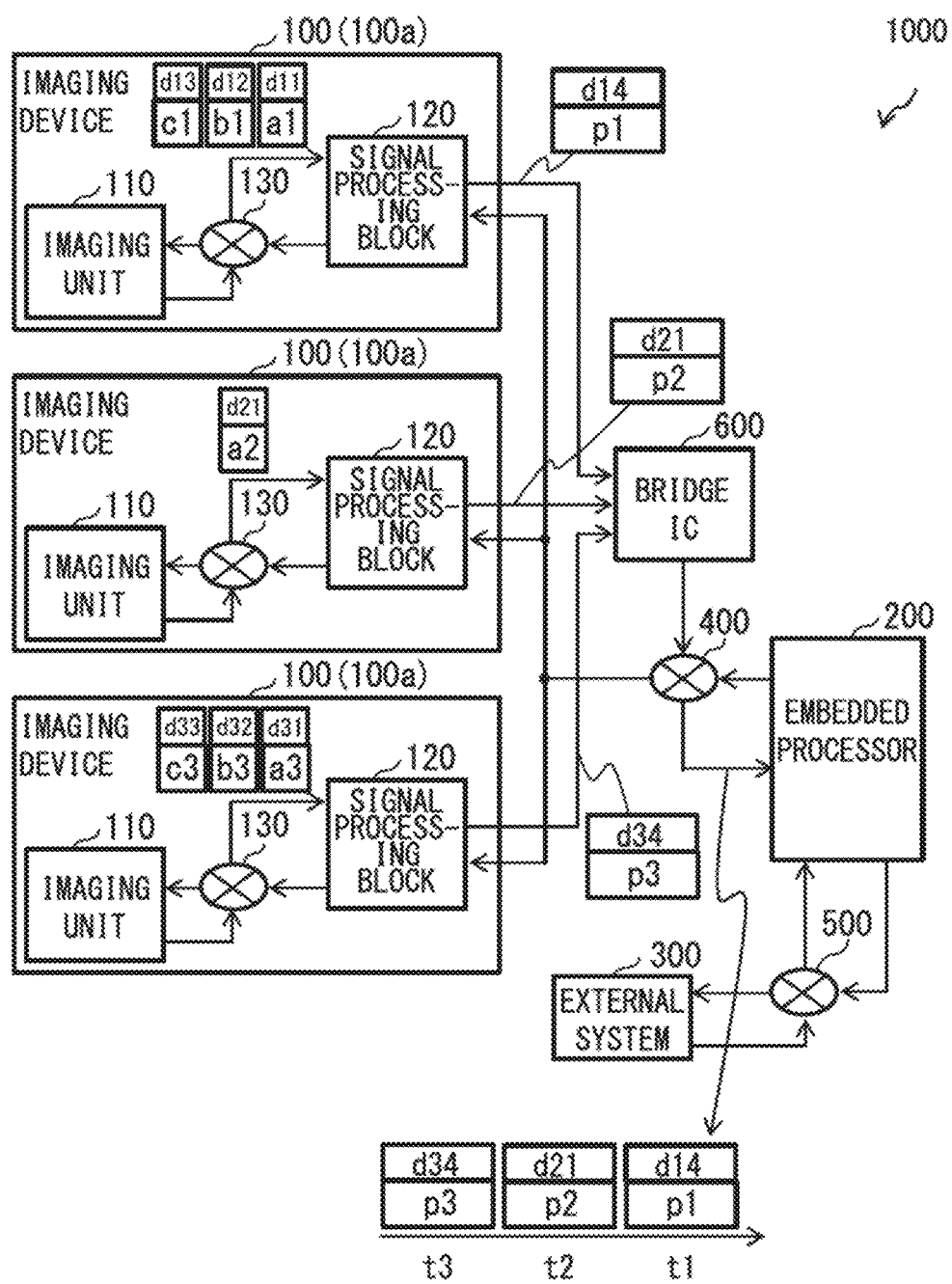
FIG. 25 is a diagram schematically illustrating data generation/data transmission by each of the imaging devices.

FIG. 24 illustrates an example of a data transmission procedure of the embedded vision system 1000 according to the present modification example. FIG. 25 schematically illustrates the data generation/data transmission by each of the imaging devices 100.

First, the imaging unit 110 of each of the imaging devices 100 (100a, 100b, and 100c) acquires the image data 111A by imaging based on a predetermined exposure timing and frame rate. The imaging unit 110 of each of the imaging devices 100 (100a, 100b, and 100c) acquires pieces of image data (the pieces of ROI image data 112A) of one or more ROIs from the image data 111A acquired by the imaging element 111 on the basis of the position of a determined ROI (step S101). The imaging unit 110 of each of the imaging devices 100 (100*a*, 100*b*, and 100*c*) further generates the auxiliary data 115B for each piece of ROI image data 112A (step S102). The imaging unit 110 of each of the imaging devices 100 (100*a*, 100*b*, and 100*c*) sends the ROI image data 112A and the auxiliary data 115B corresponding to the ROI image data 112A to the signal processing block 120 (step S103).

Next, the signal processing block 120 of each of the imaging devices 100 (100*a*, 100*b*, and 100*c*) receives the ROI image data 112A and the auxiliary data 115B corresponding to the ROI image data 112A from the imaging unit 110 (step S104). The signal processing block 120 of each of the imaging devices 100 (100*a*, 100*b*, and 100*c*) makes the output data size adjustment described above, thereby selecting the one or more pieces of image data 125A. The signal processing block 120 of each of the imaging devices 100 (100*a*, 100*b*, and 100*c*) further encodes the one or more selected pieces of image data 125A as one piece of image data for transmission (transmission data 116A). In other words, the signal processing block 120 generates the transmission data 116A by encoding (step S105).

Next, the signal processing block 120 of each of the imaging devices 100 (100*a*, 100*b*, and 100*c*) sends the transmission data 129A to the bridge IC 600 at an output timing indicated by the control section 126 (step S106). Here, in a case where the three imaging devices 100 (100*a*, 100*b*, and 100*c*) are coupled to the transmission path 400, the signal processing block 120 of the imaging device 100*a* sends the transmission data 129A (the image data p1 and the auxiliary data d14) to the bridge IC 600, for example, at predetermined timing.

Further, the signal processing block 120 of the imaging device 100*b* sends the transmission data 129A (the image data p2 and the auxiliary data d23) to the bridge IC 600, for example, at a predetermined timing. Further, the signal processing block 120 of the imaging device 100*c* sends the transmission data 129A (the image data p3 and the auxiliary data d33) to the bridge IC 600, for example, at a predetermined timing.

Next, the bridge IC 600 receives the transmission data 129A from each of the imaging devices 100 (100*a*, 100*b*, and 100*c*) (step S111). The bridge IC 600 sequentially sends the pieces of transmission data 129A received from the respective imaging devices 100 (100*a*, 100*b*, and 100*c*) to the embedded processor 200 through the transmission path 400 (step S112).

Next, the embedded processor 200 sequentially receives the plurality of pieces of transmission data 129A from the bridge IC 600 through the transmission path 400 (step S107). The embedded processor 200 extracts the auxiliary data from each the received pieces of transmission data 129A (step S108). Further, the embedded processor 200 extracts the image data from each the received pieces of transmission data 129A (step S109). The embedded processor 200 decodes image data and performs predetermined signal processing on image data obtained by decoding (step S110). In this way, data is transmitted by the embedded vision system 1000 according to the present modification example.

In the present modification example, the bridge IC 600 is provided in the transmission path 400. This makes it possible to cause the bridge IC 600 to multiplex the plurality of pieces of transmission data 129A outputted from the plurality of imaging devices 100 (100*a*, 100*b*, and 100*c*). As a result, for example, even in a case where the respective imaging devices 100 (100*a*, 100*b*, and 100*c*) output the pieces of transmission data 129A at an equal output timing, it is possible to cause the bridge IC 600 to multiplex the plurality of pieces of transmission data 129A outputted from the plurality of imaging devices 100 (100*a*, 100*b*, and 100*c*). It is thus possible to control data output timings of the respective imaging devices 100 to offer timings that are appropriate in relation to data output timings of the other one or more imaging devices 100 coupled to the common transmission path 400.

[Modification Example C]

FIG. 26 illustrates an example in which the embedded vision system 1000 is applied as a portion of a road traffic system. In the present modification example, each of the imaging devices 100 is installed, for example, at a position and in a direction that make it possible to shoot an image of a road including a plurality of lanes from the direction parallel with the traveling direction of the vehicle. In a case where the pieces of auxiliary data 115B regarding the pieces of image data 125A then include the identifiers (the camera numbers d3) of the plurality of imaging devices 100 each provided to one lane, for example, as illustrated in FIG. 26 or the positions (the camera positions d4) of the imaging devices 100, it is possible to identify the positional relationship between the plurality of pieces of image data 125A obtained at an equal imaging timing by using the camera numbers d3 or the camera positions d4 included in the pieces of auxiliary data 115B.

Figure 28:
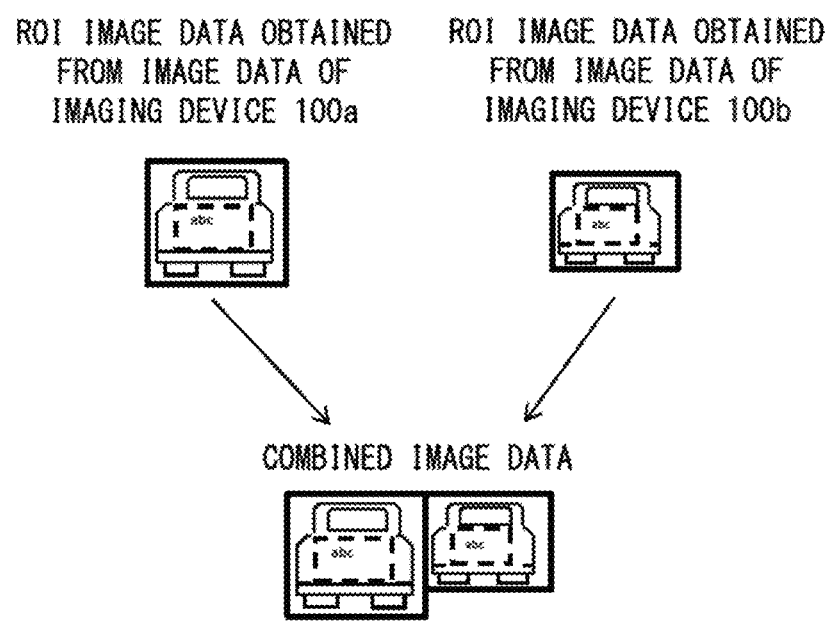
FIG. 28 is a diagram illustrating an example in which frame images are combined.

In the present modification example, it is assumed that the pieces of image data 111A, for example, as illustrated in FIG. 27 are obtained from the two imaging devices 100 (100*a* and 100*b*). The encoding section 128 may then combine the two pieces of ROI image data 112A obtained from the two imaging devices 100 (100*a* and 100*b*) in the positional relationship corresponding to the camera numbers d3 or the camera positions d4, for example, as illustrated in FIG. 28. In addition, for example, as illustrated in FIG. 28, each of the encoding sections 128 and 260 may combine the two pieces of ROI image data 112A obtained from the two imaging devices 100 (100*a* and 100*b*) in the positional relationship between the two pieces of ROI image data 112A in decoding. In such a case, it is possible to omit pieces of information regarding the camera numbers d3 and the camera positions d4 in encoding. This makes it possible to reduce the amount of data transmitted in the transmission paths 400 and 500 as compared with a case where the pieces of information regarding the camera numbers d3 and the camera positions d4 are included in the pieces of image data 128A and 260A.

[Modification Example D]

Figure 29:
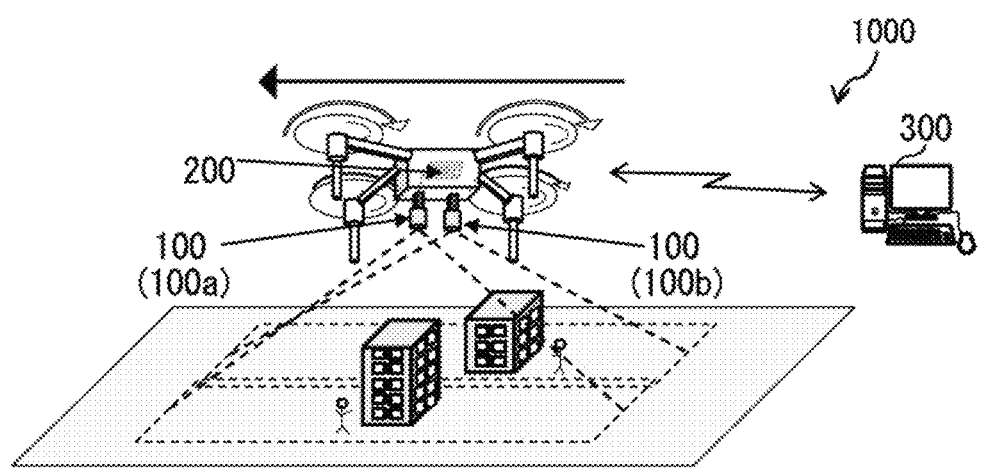
FIG. 29 is a diagram illustrating an example in which the embedded vision system is applied to a drone.
Figure 30A:
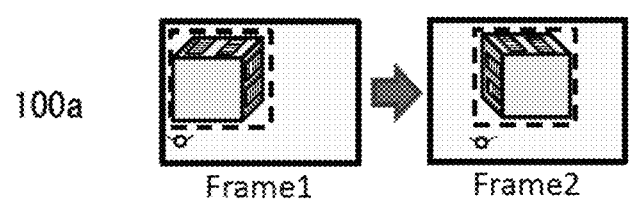
FIGS. 30A and 30B are diagrams illustrating an example of a frame image.
Figure 30B:
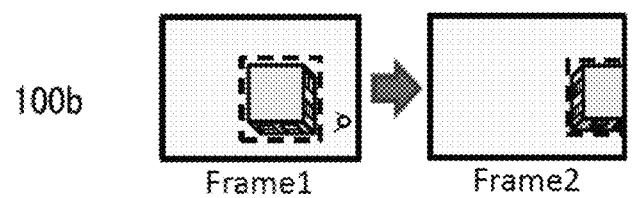

FIG. 29 illustrates an example in which the embedded vision system 1000 is applied to a drone (an unmanned aerial mobile body). In the present modification example, the plurality of imaging devices 100 (100*a* and 100*b*) and the embedded processor 200 are mounted on a drone. For example, the pieces of image data 111A as illustrated in FIGS. 30A and 30B are obtained from the plurality of imaging devices 100 (100*a* and 100*b*). The external system 300 is configured to wirelessly communicate with the embedded processor 200. The external system 300 is installed on the ground.

Here, it is assumed that the drone stays still in the air or the drone is moving in the air at low speed and the position of a target has almost no change between frames or the position of a target has just a slight change. In such a case, the ROI cut-out section 112 may divide a portion of the one or more pieces of ROI image data 112A cut out from the image data 111A into a plurality of pieces. In this case, as compared with a case where no division is carried out, it is possible to include the pieces of image data 115A each having a more equal size in the respective pieces of transmission data 116A or include the pieces of image data 128A each having a more equal size in the respective pieces of transmission data 129A.

It is to be noted that, in a case where division is carried out, the ROI image generation section 124 generates (restores) the ROI image data 112A that has not yet been divided by joining the divided pieces of image data. In this case, to avoid restoration failure because of data loss, it is preferable that the ROI cut-out section 112 perform a division process only when the position of a target has almost no change between frames.

In a case where a target is moving at high speed in spite of the drone staying still in the air or moving in the air at low speed, the position of the target has a great change between frames. In such a case, it is preferable that the ROI cut-out section 112 refrain from performing a division process to avoid restoration failure because of data loss.

Although the present disclosure has been described above with reference to the embodiment and the modification examples thereof, the present disclosure is not limited the embodiment or the like described above. The present disclosure may be modified in a variety of ways. It is to be noted that the effects described herein are merely illustrative. The effects according to the present disclosure are not limited to the effects described herein. The present disclosure may have effects other than the effects described herein.

In addition, for example, it is possible to configure the present disclosure as follows.

(1)
An imaging device including:
an imaging unit that acquires captured image data by imaging;
an encoding section that encodes a plurality of pieces of image data as one piece of image data for transmission, the plurality of pieces of image data being based on one or more pieces of captured image data acquired by the imaging unit; and
a sending section that sends the image data for transmission to an external device, the image data for transmission being generated by the encoding section.

(2)
The imaging device according to (1), in which the plurality of pieces of image data includes one or more pieces of ROI (Region Of Interest) image data, the one or more pieces of ROI image data being extracted from the one or more pieces of captured image data.

(3)
The imaging device according to (1) or (2), in which the sending section sends the image data for transmission to the external device at a timing based on a first control signal inputted from the external device.

(4)
The imaging device according to any one of (1) to (3), in which the encoding section performs encoding to bring a data size of the image data for transmission or the plurality of pieces of image data closer to a data size based on a second control signal inputted from the external device.

(5)
The imaging device according to any one of (1) to (4), further including a generation section that generates auxiliary data regarding the plurality of pieces of image data, in which
the sending section sends the auxiliary data to the external device along with the image data for transmission.

(6)
The imaging device according to (5), in which, in a case where the plurality of pieces of image data includes the one or more pieces of ROI image data, the auxiliary data includes a frame identifier, ROI identifiers, pieces of ROI positional data, and an identifier of the imaging device.

(7)
The imaging device according to (6), in which the auxiliary data further includes positional data of the imaging device.

(8)
The imaging device according to (6) or (7), in which, in a case where the plurality of pieces of image data includes the plurality of pieces of ROI image data and the pieces of ROI positional data of the plurality of respective pieces of ROI image data overlap with each other, the encoding section performs encoding by including image data of an overlapping portion thereof without omitting the image data of the overlapping portion.

(9)
The imaging device according to any one of (6) to (8), in which, in a case where the plurality of pieces of image data includes the plurality of pieces of ROI image data, the encoding section divides one piece of ROI image data of the plurality of pieces of ROI image data into two pieces of partial ROI image data and performs encoding by including one of the pieces of partial ROI image data in first image data for transmission and performs encoding by including the other piece of partial ROI image data in second image data for transmission.

(10)
The imaging device according to any one of (1) to (9), in which the sending section sends the image data for transmission to the external device by using an interface standard in which the imaging device and the external device are coupled in a one-to-one manner.

(11)
A processing device including:
a receiving section that sequentially receives pieces of first image data for transmission from a plurality of respective imaging devices coupled to a common transmission path through the transmission path, the pieces of first image data for transmission being obtained by encoding a plurality of pieces of image data;
a generation section that generates first control signals for sending timings of the pieces of first image data for transmission on the basis of a frame rate of the transmission path; and
a first sending section that sends the first control signals generated by the generation section to the plurality of imaging devices.

(12)
The processing device according to (11), in which
the generation section generates second control signals each for a data size on the basis of the frame rate of the transmission path, the data size serving as an index for encoding, and
the first sending section sends the first control signals and the second control signals generated by the generation section to the plurality of imaging devices.

(13)
The processing device according to (11) or (12), in which the receiving section receives the first image data for transmission from each of the plurality of imaging devices by using a first interface standard in which one of the plurality of imaging devices and the receiving section are coupled in a one-to-one manner.

(14)

The processing device according to any one of (11) to (13), in which the generation section generates signals as the first control signals, the signals defining sending timings that allow the pieces of first image data for transmission from the plurality of respective imaging devices to be sequentially received through the transmission path.

(15)

The processing device according to (12), in which the generation section generates signals as the second control signals, the signals defining a data size that allows the pieces of first image data for transmission from the plurality of respective imaging devices to be received at a predetermined frame rate.

(16)

The processing device according to (13), further including:

a decoding section that acquires the plurality of pieces of image data from each of the pieces of first image data for transmission received by the receiving section by decoding the first image data for transmission;

an encoding section that encodes the plurality of pieces of image data as one piece of second image data for transmission, the plurality of pieces of image data being acquired by the decoding section; and a second sending section that sends the second image data for transmission generated by the encoding section to an external system by using a second interface standard different from the first interface standard.

(17)

The processing device according to (16), in which the receiving section receives auxiliary data regarding the plurality of pieces of image data, in a case where the plurality of pieces of image data includes the one or more pieces of ROI image data, the auxiliary data includes a frame identifier, ROI identifiers, pieces of ROI positional data, and an identifier of the imaging device, and the encoding section encodes a plurality of pieces of image data obtained from the pieces of image data for transmission from the plurality of respective imaging devices on the basis of identifiers of the plurality of respective imaging devices.

(18)

A data transmission system including a plurality of imaging devices and an external device that are coupled to a common transmission path, in which each of the imaging devices includes an imaging unit that acquires captured image data by imaging, an encoding section that encodes a plurality of pieces of image data as one piece of image data for transmission, the plurality of pieces of image data being based on one or more pieces of captured image data obtained by the imaging unit, and a first sending section that sends the image data for transmission to the external device through the transmission path at a timing based on a first control signal inputted from the external device, the image data for transmission being generated by the encoding section, and the external device includes a receiving section that sequentially receives the pieces of image data for transmission from the plurality of respective imaging devices through the transmission path, a generation section that generates the first control signals as signals for sending timings of the pieces of image data for transmission on the basis of a frame rate of the transmission path, and a second sending section that sends the first control signals generated by the generation section to the plurality of imaging devices.

(19)

The data transmission system according to (18), in which the generation section generates second control signals each for a data size on the basis of the frame rate of the transmission path, the data size serving an index for encoding, the second sending section sends the first control signals and the second control signals generated by the generation section to the plurality of imaging devices, and the encoding section performs encoding to bring a data size of the image data for transmission or the plurality of pieces of image data closer to a data size based on the second control signal inputted from the external device.

(20)

A data transmission method for a plurality of imaging devices and an external device that are coupled to a common transmission path, the data transmission method including:

encoding, by each of the imaging devices, a plurality of pieces of image data as one piece of image data for transmission and then sending the image data for transmission to the external device through the transmission path at a timing based on a first control signal inputted from the external device, the plurality of pieces of image data being based on one or more pieces of captured image data obtained by imaging, the image data for transmission being obtained by encoding;

sequentially receiving, by the external device, the pieces of image data for transmission from the plurality of respective imaging devices through the transmission path; and generating, by the external device, the first control signals as signals for sending timings of the pieces of image data for transmission on the basis of a frame rate of the transmission path and sending the signals to the plurality of imaging devices.

The imaging device according to the embodiment of the present disclosure encodes the plurality of pieces of image data based on the one or more pieces of captured image data acquired by the imaging unit as the one piece of image data for transmission and sends the encoded image data for transmission to the external device. This makes it possible to easily control the output timings of the respective imaging devices coupled to the common transmission path.

The processing device according to the embodiment of the present disclosure generates the control signals for the sending timings of the pieces of image data for transmission on the basis of the frame rate of the transmission path to which the plurality of imaging devices is coupled and sends the control signals to the plurality of imaging devices through the transmission path. This makes it possible to easily control the output timings of the respective imaging devices coupled to the common transmission path.

The data transmission system according to the embodiment of the present disclosure encodes the plurality of pieces of image data based on the one or more pieces of captured image data obtained by the imaging unit as the one piece of image data for transmission, sends the encoded image data for transmission to the external device at the timing based on the control signal inputted from the external device, generates the control signals as the signals for the sending timings of the pieces of image data for transmission on the basis of the frame rate of the transmission path, and sends the signals from the external device to the plurality of imaging devices. This makes it possible to easily control the output timings of the respective imaging devices coupled to the common transmission path.

The data transmission method according to the embodiment of the present disclosure encodes the plurality of pieces of image data based on the one or more pieces of captured image data obtained by imaging as the one piece of image data for transmission, sends the encoded image data for transmission to the external device at the timing based on the control signal inputted from the external device, generates the control signals as the signals for the sending timings of the pieces of image data for transmission on the basis of the frame rate of the transmission path, and sends the signals from the external device to the plurality of imaging devices. This makes it possible to easily control the output timings of the respective imaging devices coupled to the common transmission path.

This application claims the priority on the basis of Japanese Patent Application No. 2019-158635 filed with Japan Patent Office on Aug. 30, 2019, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging device, comprising:
  circuitry configured to:
    control acquisition of captured image data by imaging;
    encode a plurality of pieces of image data as one piece of image data for transmission, the plurality of pieces of image data being based on at least one piece of captured image data, wherein the plurality of pieces of image data includes at least one piece of Region of Interest (RoI) image data;
    generate auxiliary data regarding the plurality of pieces of image data wherein, based on a determination that the plurality of pieces of image data includes the at least one piece of ROI image data, the auxiliary data includes a frame identifier, ROI identifiers, pieces of ROI positional data, and an identifier of the imaging device; and
    control transmission of the image data and the generated auxiliary data to an external device.

2. The imaging device according to claim 1, wherein the at least one piece of ROI image data is extracted from the at least one piece of captured image data.

3. The imaging device according to claim 1, wherein the circuitry is further configured to control transmission of the image data to the external device at a timing based on a first control signal inputted from the external device.

4. The imaging device according to claim 3, wherein the circuitry is further configured to execute encoding to bring a data size of the image data for transmission or the plurality of pieces of image data closer to a data size based on a second control signal inputted from the external device.

5. The imaging device according to claim 1, wherein the auxiliary data further includes positional data of the imaging device.

6. The imaging device according to claim 1, wherein, based on a determination that the plurality of pieces of image data includes a plurality of pieces of ROI image data and the pieces of ROI positional data of each of the plurality of pieces of ROI image data overlap with each other, the circuitry is further configured to encode by including image data of an overlapping portion thereof without omitting the image data of the overlapping portion.

7. The imaging device according to claim 1, wherein, based on a determination that the plurality of pieces of image data includes a plurality of pieces of ROI image data, the circuitry is further configured to:
  divide one piece of ROI image data of the plurality of pieces of ROI image data into two pieces of partial ROI image data;
  execute encoding by including a first piece of partial ROI image data in first image data for transmission; and
  execute encoding by including a second piece of partial ROI image data in second image data for transmission.

8. The imaging device according to claim 1, wherein the circuitry is further configured to control transmission of the image data to the external device by using an interface standard in which the imaging device and the external device are coupled in a one-to-one manner.

9. A processing device, comprising:
  circuitry configured to:
    sequentially receive, through a transmission path, pieces of first image data for transmission from a plurality of imaging devices, wherein
      the plurality of imaging devices is coupled to a common transmission path, and
      the pieces of first image data for transmission is obtained by encoding a plurality of pieces of image data;
    generate first control signals for sending timings of the pieces of first image data for transmission based on a frame rate of the transmission path; and
    control transmission of the generated first control signals to the plurality of imaging devices.

10. The processing device according to claim 9, wherein the circuitry is further configured to:
  generate second control signals each for a data size based on the frame rate of the transmission path, the data size serving as an index for encoding, and
  transmit the generated first control signals and the generated second control signals to the plurality of imaging devices.

11. The processing device according to claim 9, wherein the circuitry is further configured to receive the first image data for transmission from each of the plurality of imaging devices based on a first interface standard in which one of the plurality of imaging devices and the circuitry are coupled in a one-to-one manner.

12. The processing device according to claim 9, wherein the circuitry is further configured to generate signals as the first control signals, the signals defining sending timings that allow the pieces of first image data for transmission from the plurality of respective imaging devices to be sequentially received through the transmission path.

13. The processing device according to claim 10, wherein the circuitry is further configured to generate signals as the second control signals, the signals defining a data size that allows the pieces of first image data for transmission from the plurality of respective imaging devices to be received at a specific frame rate.

14. The processing device according to claim 11, wherein the circuitry is further configured to:
  acquire the plurality of pieces of image data from each of the pieces of first image data for transmission by decoding the first image data for transmission;
  encode the plurality of pieces of image data as one piece of second image data for transmission; and transmit the second image data to an external system by using a second interface standard different from the first interface standard.

15. The processing device according to claim 14, wherein receive auxiliary data regarding the plurality of pieces of image data, based on a determination that the plurality of pieces of image data includes at least one piece of ROI image data, the auxiliary data includes a frame identifier, ROI identifiers, pieces of ROI positional data, and an identifier of an imaging device of the plurality of imaging devices, and encode a plurality of pieces of image data obtained from the pieces of image data for transmission from the plurality of imaging devices based on identifiers of the plurality of imaging devices.

16. A data transmission system, comprising
a plurality of imaging devices and an external device that are coupled to a common transmission path, wherein each of the plurality of imaging devices includes
an imaging unit configured to acquire captured image data by imaging,
an encoding section configured to encode a plurality of pieces of image data as one piece of image data for transmission, the plurality of pieces of image data being based on at least one piece of captured image data obtained by the imaging unit, and
a first sending section configured to transmit the image data for transmission to the external device through the common transmission path at a timing based on a first control signals inputted from the external device, the image data for transmission being generated by the encoding section, and
the external device includes
a receiving section configured to sequentially receive the pieces of image data for transmission from the plurality of respective imaging devices through the common transmission path,
a generation section configured to generate the first control signals as signals for sending timings of the pieces of image data for transmission based on of a frame rate of the common transmission path, and
a second sending section configured to transmit the first control signals generated by the generation section to the plurality of imaging devices.

17. The data transmission system according to claim 16, wherein
the generation section is further configured to generate second control signals each for a data size based on the frame rate of the common transmission path, the data size serving an index for encoding,
the second sending section is further configured to transmit the first control signals and the second control signals generated by the generation section to the plurality of imaging devices, and
the encoding section is further configured to execute encoding to bring a data size of the image data for transmission or the plurality of pieces of image data closer to a data size based on the second control signal inputted from the external device.

18. A data transmission method for a plurality of imaging devices and an external device that are coupled to a common transmission path, the data transmission method comprising:
encoding, by each of the imaging devices, a plurality of pieces of image data as one piece of image data for transmission;
sending the image data for transmission to the external device through the common transmission path at a timing based on a first control signals signal inputted from the external device, the plurality of pieces of image data being based on at least one or more pieces piece of captured image data obtained by imaging, the image data for transmission being obtained by encoding;
sequentially receiving, by the external device, the pieces of image data for transmission from the plurality of respective imaging devices through the common transmission path; and
generating, by the external device, the first control signals as signals for sending timings of the pieces of image data for transmission based on a basis of a frame rate of the common transmission path and sending the signals to the plurality of imaging devices.

* * * * *